(12) United States Patent
Hammerschmidt et al.

(10) Patent No.: US 8,009,759 B2
(45) Date of Patent: *Aug. 30, 2011

(54) PROGRAMMABLE TRANSMITTER

(75) Inventors: Joachim S. Hammerschmidt, Mountain View, CA (US); Bruce E. Edwards, Belmont, MA (US); Venkat Kodavati, San Jose, CA (US); Rajendra Tushar Moorti, Mountain View, CA (US); Ling Su, Cupertino, CA (US); Jason A. Trachewsky, Menlo Park, CA (US); Andrew Wagner, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/346,367

(22) Filed: Dec. 30, 2008

(65) Prior Publication Data
US 2009/0143030 A1 Jun. 4, 2009

Related U.S. Application Data

(63) Continuation of application No. 11/166,808, filed on Jun. 24, 2005, now Pat. No. 7,535,972.

(51) Int. Cl.
*H04L 27/00* (2006.01)

(52) U.S. Cl. ........................................ 375/295
(58) Field of Classification Search .................. 375/295, 375/222, 260; 455/522
See application file for complete search history.

(56) References Cited

U.S. PATENT DOCUMENTS

| | | | |
|---|---|---|---|
| 6,172,993 B1 * | 1/2001 | Kim et al. ..................... | 370/516 |
| 2004/0082356 A1 * | 4/2004 | Walton et al. ................. | 455/522 |
| 2005/0169358 A1 * | 8/2005 | Redfern et al. ............... | 375/222 |
| 2006/0227908 A1 * | 10/2006 | Scharf et al. .................. | 375/346 |

* cited by examiner

*Primary Examiner* — Dac Ha
*Assistant Examiner* — Leon-Viet Q Nguyen
(74) *Attorney, Agent, or Firm* — Garlick Harrison & Markison; Holly L. Rudnick

(57) ABSTRACT

A programmable transmitter generates a frame in a frame format according to one of a plurality of operating modes using a frame structure table storing a respective frame format for each of the operating modes. The transmitter includes a frame structure engine that receives a mode selection signal indicative of a select operating mode, and accesses the frame structure table to determine the frame format of the select operating mode. The frame structure engine produces a control signal to a frame generator to control the generation of a frame in the frame format of the select operating mode.

20 Claims, 17 Drawing Sheets

SIG Tone Map 540b

| | | | |
|---|---|---|---|
| 0 | 0000 | Off | |
| 1 | 0001 | SIG-Data | ('D') |
| 2 | 0010 | SIG_Data, rot by +90 deg | ('D9') |
| 3 | 0011 | SIG_Data, rot by 180 deg | ('E') |
| 4 | 0100 | SIG_Data, rot by -90deg | ('E9') |
| 5 | 0101 | [reserved] | |
| 6 | 0110 | [reserved] | |
| 7 | 0111 | [reserved] | |
| 8 | 1000 | Pilot: Static +1 | ('PO') |
| 9 | 1001 | Pilot: Static +j | ('OP') |
| 10 | 1010 | Pilot: Static -1 | ('MO') |
| 11 | 1011 | Pilot: Static -j | ('OM') |
| 12 | 1100 | Pilot: Ext (no Triggers) | ('XN') |
| 13 | 1101 | Pilot: Ext (trigger Table Seq) | ('XT') |
| 14 | 1110 | Pilot: Ext (trigger PN Seq) | ('XP') |
| 15 | 1111 | Pilot: Ext (trigger both pilot seq's) | ('XB') |

FIG. 7B

TrainFd (LT/ST) 540a

| | | |
|---|---|---|
| 0 | 0000 | Off (guard) |
| 1 | 0001 | [reserved] |
| 2 | 0010 | [reserved] |
| 3 | 0011 | [reserved] |
| 4 | 0100 | [reserved] |
| 5 | 0101 | [reserved] |
| 6 | 0110 | [reserved] |
| 7 | 0111 | [reserved] |
| 8 | 1000 | +1 |
| 9 | 1001 | +j |
| 10 | 1010 | -1 |
| 11 | 1011 | -j |
| 12 | 1100 | +1+j |
| 13 | 1101 | -1+j |
| 14 | 1110 | -1-j |
| 15 | 1111 | +1-j |

FIG. 7A

DATA Tone Map 540c

| | | | |
|---|---|---|---|
| 0 | 0000 | Off | |
| 1 | 0001 | Data | ('D') |
| 2 | 0010 | [reserved] | |
| 3 | 0011 | [reserved] | |
| 4 | 0100 | [reserved] | |
| 5 | 0101 | [reserved] | |
| 6 | 0110 | [reserved] | |
| 7 | 0111 | [reserved] | |
| 8 | 1000 | Pilot: Static +1 | ('PO') |
| 9 | 1001 | Pilot: Static +j | ('OP') |
| 10 | 1010 | Pilot: Static -1 | ('MO') |
| 11 | 1011 | Pilot: Static -j | ('OM') |
| 12 | 1100 | Pilot: Ext (no Triggers) | ('XN') |
| 13 | 1101 | Pilot: Ext (trigger Table Seq) | ('XT') |
| 14 | 1110 | Pilot: Ext (trigger PN Seq) | ('XP') |
| 15 | 1111 | Pilot: Ext (trigger both pilot seq's) | ('XB') |

FIG. 7C

PROGRAMMABLE TRANSMITTER

CROSS-REFERENCE TO RELATED APPLICATIONS

The present U.S. Utility Patent Application claims priority pursuant to 35 U.S.C. § 120 as a continuation to U.S. Utility application Ser. No. 11/166,808, entitled, "Programmable Transmitter," (Attorney Docket No. BP4654), filed Jun. 24, 2005, pending, which is hereby incorporated herein by reference in its entirety and made part of the present U.S. Utility Patent Application for all purposes.

BACKGROUND OF THE INVENTION

1. Technical Field of the Invention

This invention relates generally to wireless communication systems and in particular to a transmitter operating at high data rates within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is essentially a single-input-single-output (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a portion of baseband signals into RF signals, which are transmitted via corresponding antennas to a receiver. The receiver includes a single receiver path that receives the multiple RF signals from the transmitter.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a communication system. For example, high data rates can be achieved with MIMO communications in comparison to SISO communications. However, most communication systems include legacy wireless communication devices (i.e., devices that are compliant with an older version of a wireless communication standard). As such, a transmitter capable of MIMO wireless communications should also be backward compatible with legacy devices to function in a majority of existing communication systems.

In addition to the different type of wireless communications (e.g., SISO, SIMO, MISO, and MIMO), the channel bandwidth varies from standard to standard. For example, IEEE 802.11 (j) prescribes a 10 MHz channel bandwidth, IEEE 802.11(a) and (g) prescribe a 20 MHz channel, and IEEE 802.11(n) is contemplating a channel bandwidth of 40 MHz. Accordingly, for a radio to be compliant with one or more of these standards, the radio transmitter must be adjustable to accommodate the different channel bandwidths and transmission modes.

Therefore, a need exists for a programmable transmitter that is capable of high data throughput, backward compatible with legacy devices and adjustable to different channel bandwidths.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIGS. 7A, 7B and 7C are diagrams of exemplary entries of frequency domain tone map tables for use in the programmable transmitter of FIG. 4 in accordance with the present invention;

DETAILED DESCRIPTION OF THE INVENTION

Figure 1:
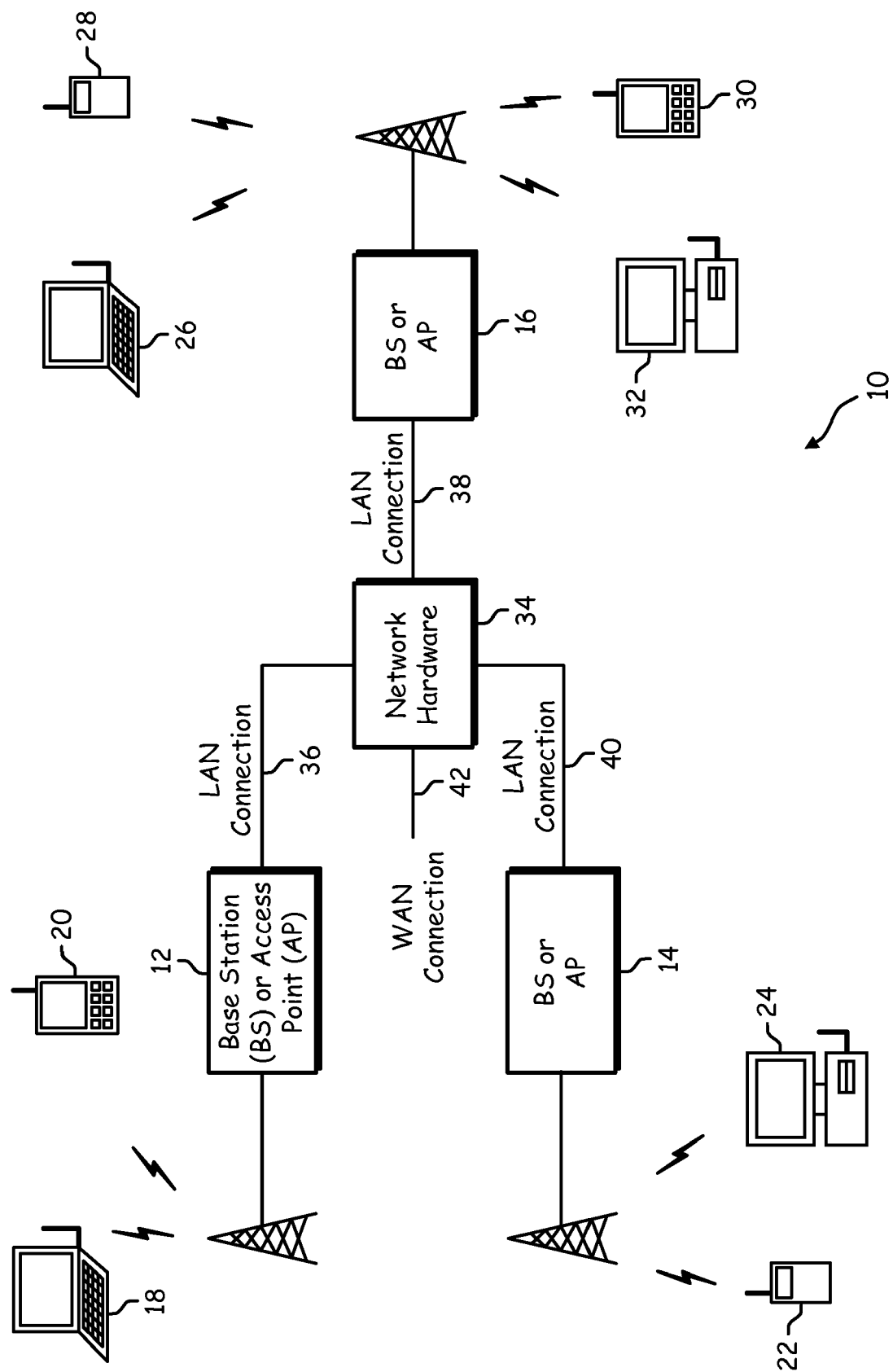
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
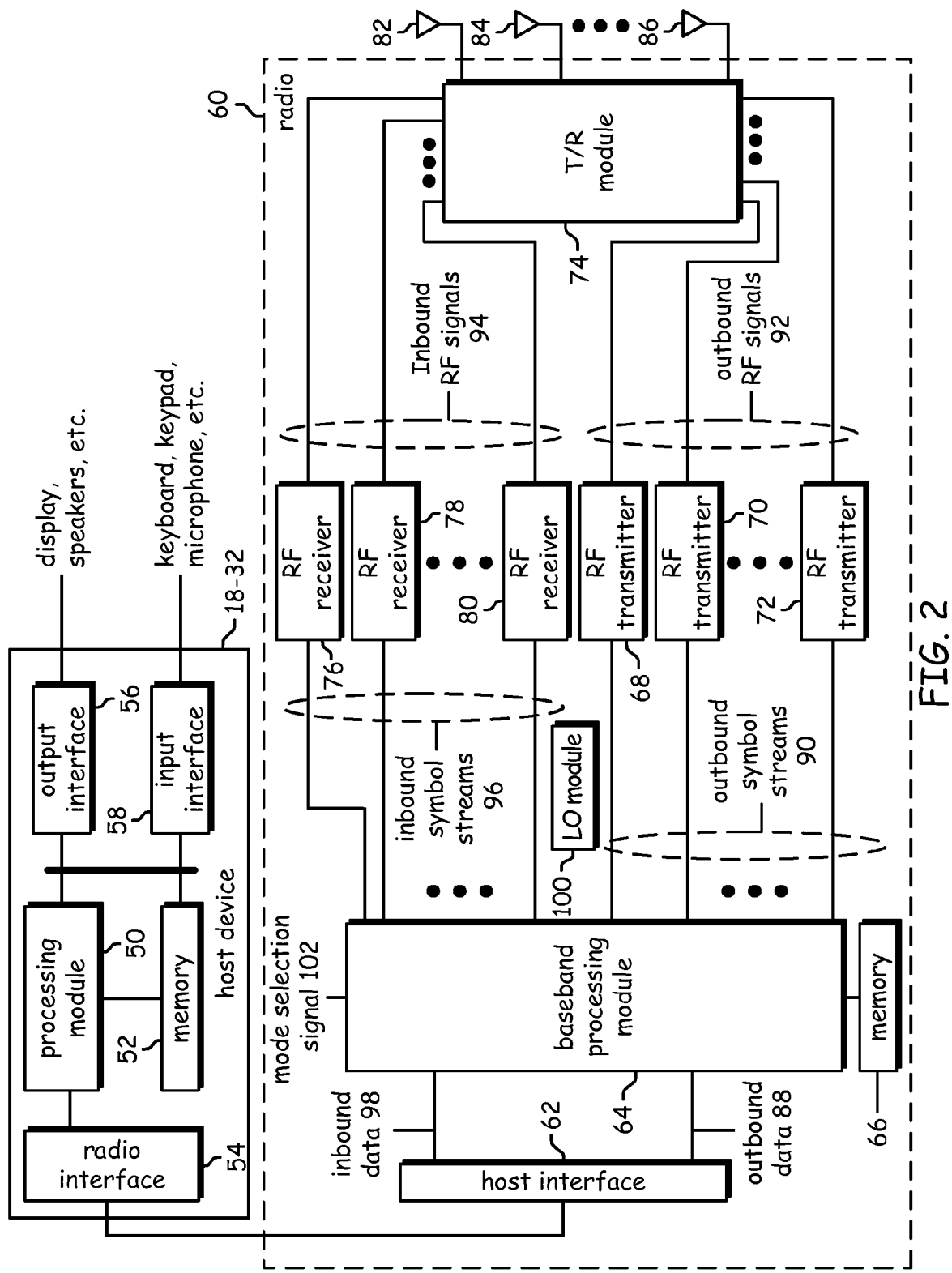
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80 and a local oscillation module 100. The baseband processing module 64, in combination with operational instructions stored in memory 66, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 indicates a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal 102 may indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per Orthogonal Frequency Division Multiplexing (OFDM) symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a SISO, SIMO, MISO or MIMO communication, and a corresponding space-time and/or space-frequency encoding mode.

The baseband processing module 64, based on the mode selection signal 102 produces one or more outbound symbol streams 90 from the outbound data 88. For example, if the mode selection signal 102 indicates that a single transmit antenna is being utilized for the particular mode that has been selected, the baseband processing module 64 will produce a single outbound symbol stream 90. Alternatively, if the mode select signal 102 indicates 2, 3 or 4 antennas, the baseband processing module 64 will produce 2, 3 or 4 outbound symbol streams 90 from the outbound data 88.

Depending on the number of outbound streams 90 produced by the baseband module 64, a corresponding number of the RF transmitters 68-72 will be enabled to convert the outbound symbol streams 90 into outbound RF signals 92. In general, each of the RF transmitters 68-72 includes a digital filter and upsampling module, a digital to analog conversion module, an analog filter module, a frequency up conversion module, a power amplifier, and a radio frequency bandpass filter. The RF transmitters 68-72 provide the outbound RF signals 92 to the transmit/receive module 74, which provides each outbound RF signal to a corresponding antenna 82-86.

When the radio 60 is in the receive mode, the transmit/receive module 74 receives one or more inbound RF signals 94 via the antennas 82-86 and provides them to one or more RF receivers 76-80. The RF receiver 76-80 converts the inbound RF signals 94 into a corresponding number of inbound symbol streams 96. The number of inbound symbol streams 96 will correspond to the particular mode in which the data was received. The baseband processing module 64 converts the inbound symbol streams 96 into inbound data 98, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3A:
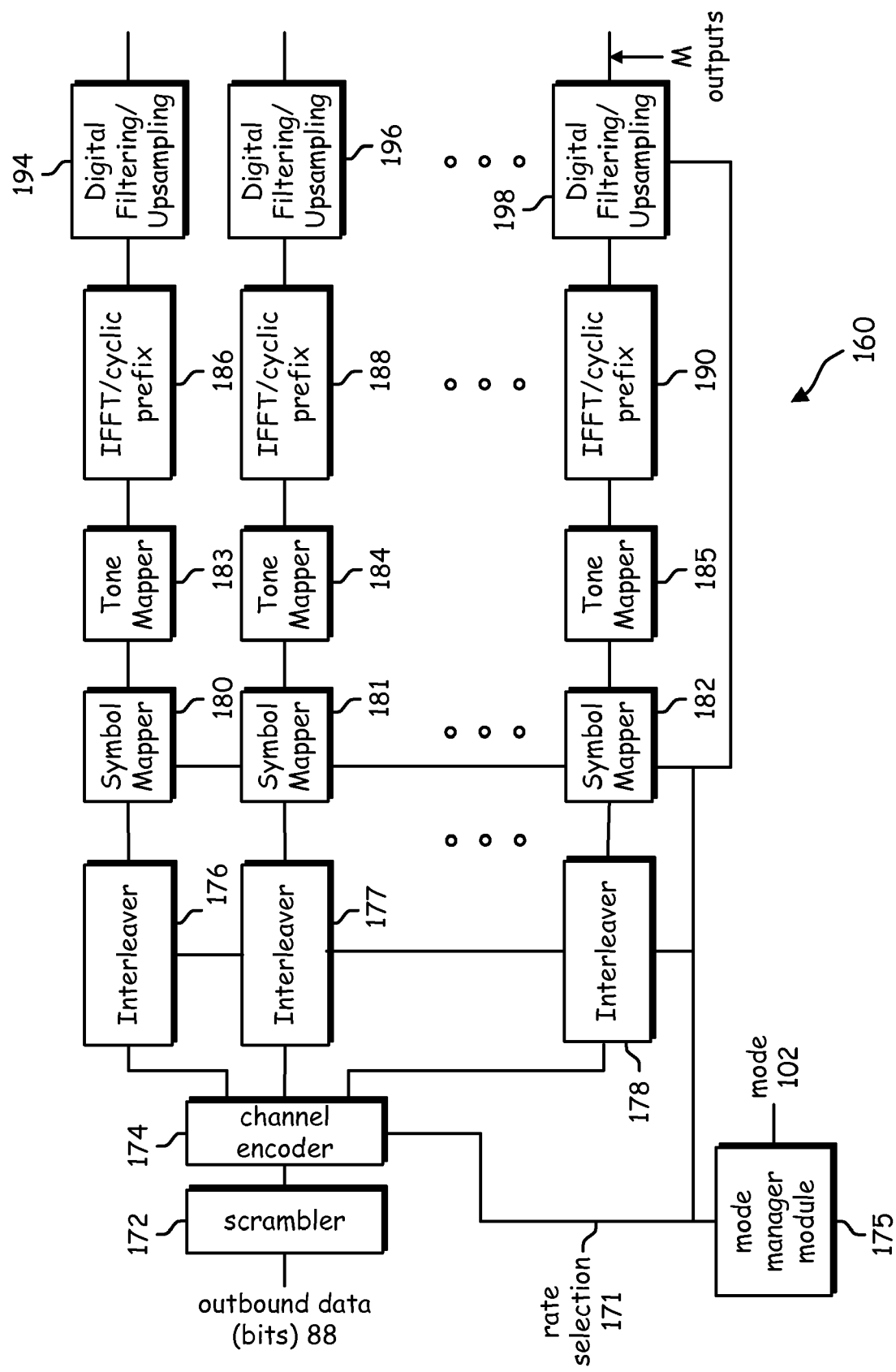
FIGS. 3A and 3B are a schematic block diagram of a radio transmitter in accordance with the present invention.
Figure 3B:
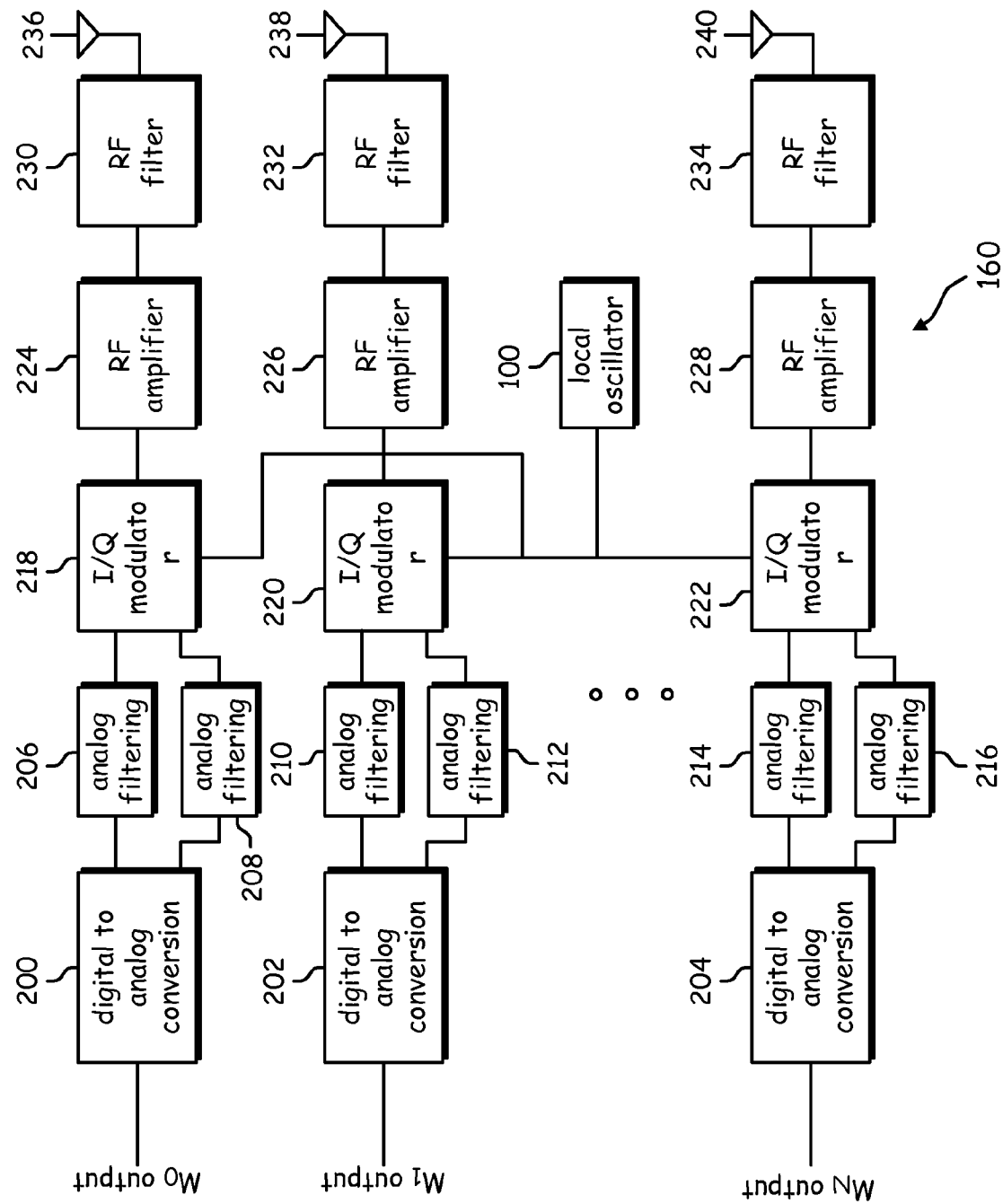

FIGS. 3A and 3B illustrate a more detailed schematic block diagram of an exemplary multiple transmit path transmitter 160 (e.g., including baseband processing module 64 and RF transmitters 68-72 of the radio transceiver 60 of FIG. 2) using Orthogonal Frequency Division Multiplexing (OFDM) in accordance with the present invention. FIG. 3A illustrates an exemplary baseband processing portion of the transmitter 160, while FIG. 3B illustrates an exemplary radio portion of the transmitter 160. In FIG. 3A, the baseband processing portion is shown to include a scrambler 172, channel encoder 174, a plurality of interleavers 176-178, a plurality of symbol mappers 180-182, a plurality of tone mappers 183-185, plurality of inverse fast Fourier transform (IFFT)/cyclic prefix addition modules 186-190 and plurality of digital filter/up-sampling modules 194-198. The baseband portion of the transmitter 160 may further include a mode manager module 175 that receives the mode selection signal 102 and produces a rate and transmit mode selection signal 171 for the baseband portion of the transmitter.

In operation, the scrambler 172 adds a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, in IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of 1/2, 2/3 and 3/4 according to specified rate tables. For backward compatibility with IEEE 802.11(b) and the CCK modes of IEEE 802.11(g), the channel encoder has the form of a CCK code as defined in IEEE 802.11(b). For higher data rates, the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. In other embodiments, there may be multiple channel encoders, instead of the single channel encoder 174 shown in FIG. 3A.

The channel encoder 174 further converts the serial encoded data stream into M-parallel streams for transmission and provides the M-parallel streams to interleavers 176-178. The interleavers 176-178 receive the encoded data streams and spread the encoded data streams over multiple symbols and multiple transmit paths. This allows improved detection and error correction capabilities at the receiver. In one embodiment, the interleavers 176-178 follow the IEEE 802.11(a) or (g) standard in the backward compatible modes. In another embodiment, the interleavers 176-178 follow the IEEE 802.11(n) standard. In other embodiments, there may be different configurations of the encoder/scrambler/interleaver, such as combinations of single or multiple interleavers, single or multiple encoders, single or multiple scramblers and single or multiple spatial demultiplexers for demultiplexing the serial data stream into M-parallel streams.

Each symbol mapper 180-182 receives a corresponding one of the M-parallel paths of data from interleavers 176-178. Each tone mapper 183-185 maps bit streams to quadrature amplitude modulated QAM symbols (e.g., BPSK, QPSK, 16 QAM, 64 QAM, 256 QAM, et cetera) for each tone of an OFDM channel according to a specific rate table. For IEEE 802.11(a) backward compatibility, double gray coding may be used. The QAM symbols for each tone collectively form a frequency domain OFDM symbol. Each tone mapper 183-185 generate the tones (e.g., subcarriers of an OFDM channel) for a particular transmit antenna, in which each tone contains a sequence of QAM frequency domain symbols. This may also include empty guard tones or pilot tones, i.e., tones known to the receiver.

The complex QAM tone amplitudes produced by each of the tone mappers 183-185 are provided to the IFFT/cyclic prefix addition modules 186-190, which perform frequency domain to time domain conversions and optionally add a prefix, which allows removal of inter-symbol interference at the receiver. For example, a 64-point IFFT can be used for 20 MHz channels and 128-point IFFT can be used for 40 MHz channels. The output of the IFFTs 186-190 are respective time domain OFDM symbols to be transmitted in a respective channel. Each time domain OFDM symbol is a superposition of the time domain QAM symbols for each of the tones. The digital filtering/up-sampling modules 194-198 filter the corresponding symbols and adjust the sampling rates to correspond with the desired sampling rates of the radio portion of the transmitter 160.

FIG. 3B illustrates the radio portion of the transmitter 160 that includes a plurality of digital-to-analog conversion modules 200-204, analog filters 206-216, I/Q modulators 218-222, RF amplifiers 224-228, RF filters 230-234 and antennas 236-240. The M-outputs from the digital filtering/up-sampling modules 194-198 are received by respective digital-to-analog conversion modules 200-204. In operation, the number of radio paths that are active correspond to the number of M-outputs. For example, if only one M-output path is generated, only one of the radio transmitter paths will be active. As one of average skill in the art will appreciate, the number of output paths may range from one to any desired number.

The digital-to-analog conversion modules 200-204 convert the digital filtered and up-sampled signals into corresponding in-phase and quadrature analog signals. The analog filters 206-216 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals. The RF amplifiers 224-228 amplify the RF signals which are then subsequently filtered via RF filters 230-234 before being transmitted via antennas 236-240.

Figure 4A:
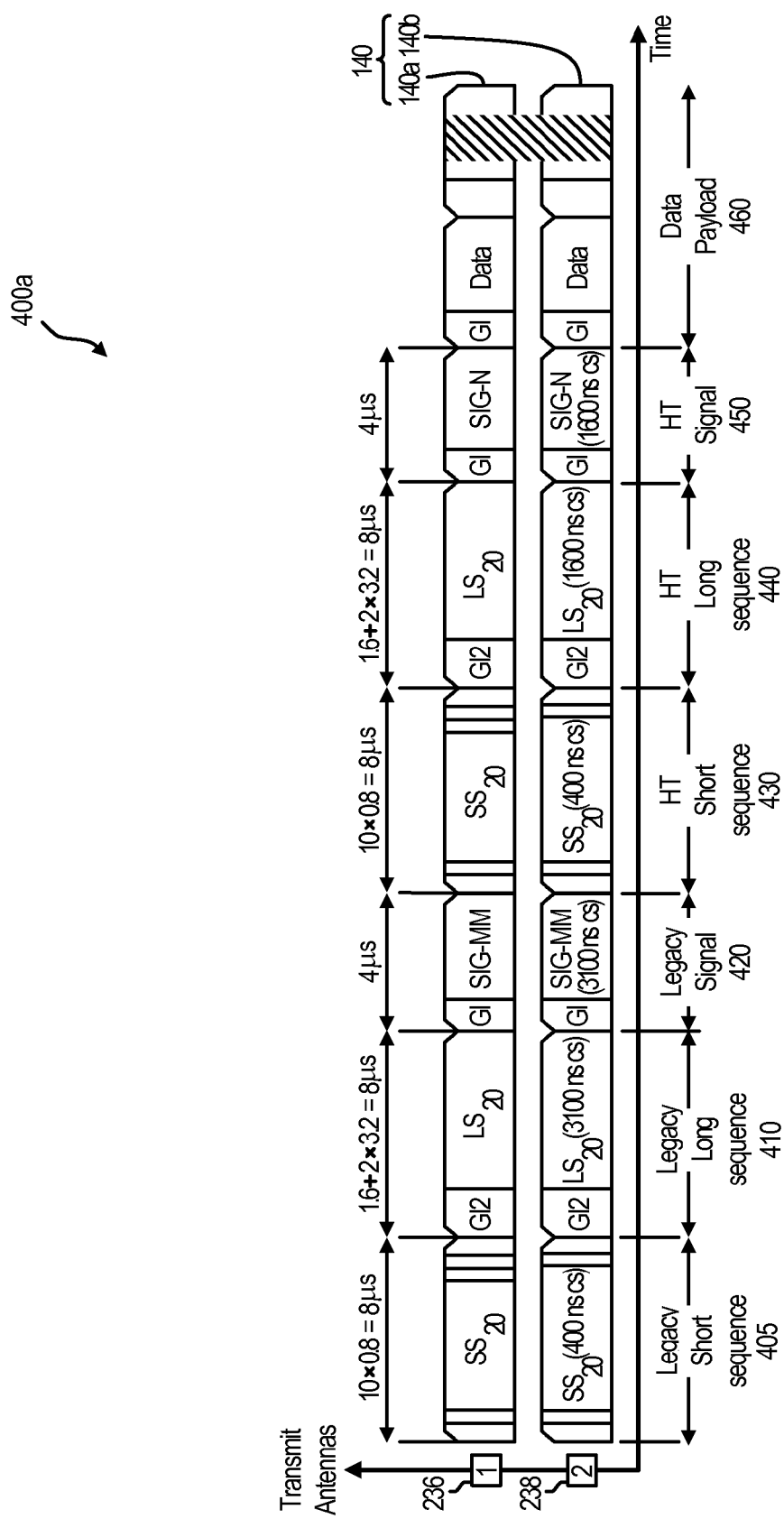
FIGS. 4A and 4B are diagrams of frame formats of different operating modes which could be generated using the present invention.
Figure 4B:
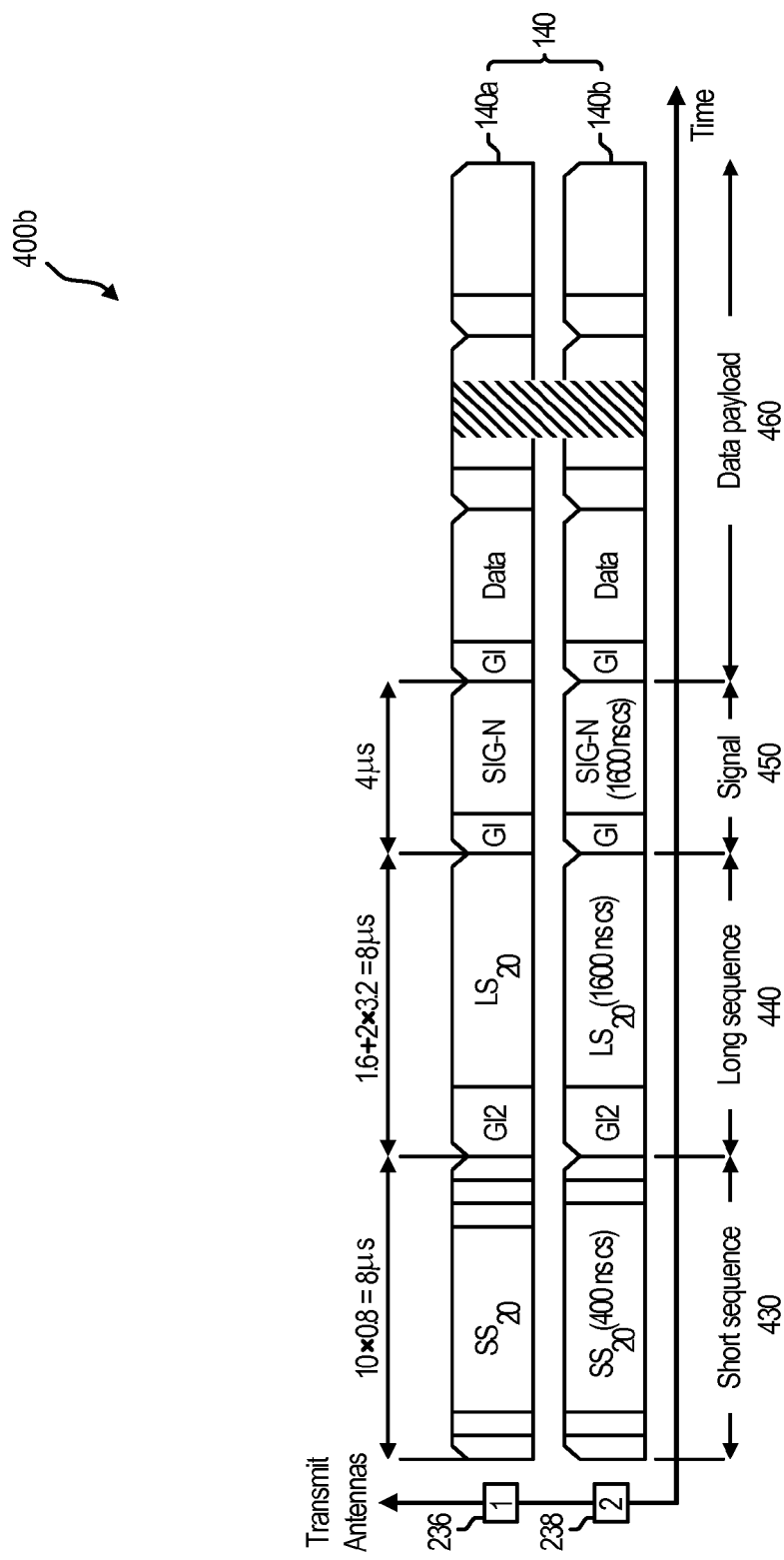

FIGS. 4A and 4B are diagrams of various formats of a frame 140, or portion thereof, according to different operating modes. FIG. 4A illustrates a frame format 400a for a 40 MHz frame 140 in a MIMO mixed mode providing backwards compatibility to legacy devices. FIG. 4B illustrates a frame format 400b for a 40 MHz frame 140 in a MIMO high data rate (HDR)-only mode that does not provide backwards compatibility to legacy devices. In a MIMO system, as shown in FIGS. 4A and 4B, the data is split across two or more transmitters (e.g., antennas 236 and 238). Thus, the frame 140 is likewise split into frame portions 140a and 140b, each being sent across one of the two antennas 236 and 238. For example, frame portion 140a is sent over antenna 236 and frame portion 140b is sent over antenna 238.

As used herein, the term "frame" includes both a single stream frame and a frame portion of a multiple stream frame. Each frame 140 includes a preamble and a data payload. The preamble is implemented in accordance with a version of IEEE 802.11. For example, in one embodiment, as shown in FIGS. 4A and 4B, the preamble includes a high-throughput (HT) short training sequence segment 430 including a sequence of known short OFDM symbols, a HT long training sequence segment 440 including a sequence of known longer OFDM symbols and a HT signal-field segment 450 indicating the modulation, coding scheme and length of a data segment 460 of the frame 140. The HT short sequence and HT long sequence are used by a receiver to synchronize the receiver and adjust the receiver settings in accordance with channel characteristics. However, in FIG. 4A, in order to be backwards compatible with legacy devices, the preamble also includes a legacy short training segment 405, a legacy long training segment 410 and a legacy signal-field segment 420. Thus, the frame format 400a shown in FIG. 4A includes three additional frame segments not included in the frame format

400b shown in FIG. 4B. Many different transmit formats are conceivable, differing in the overall bandwidth, use of tones for guard purposes, pilot purposes or data purposes, number of streams, number of frame segments, etc.

Figure 5:
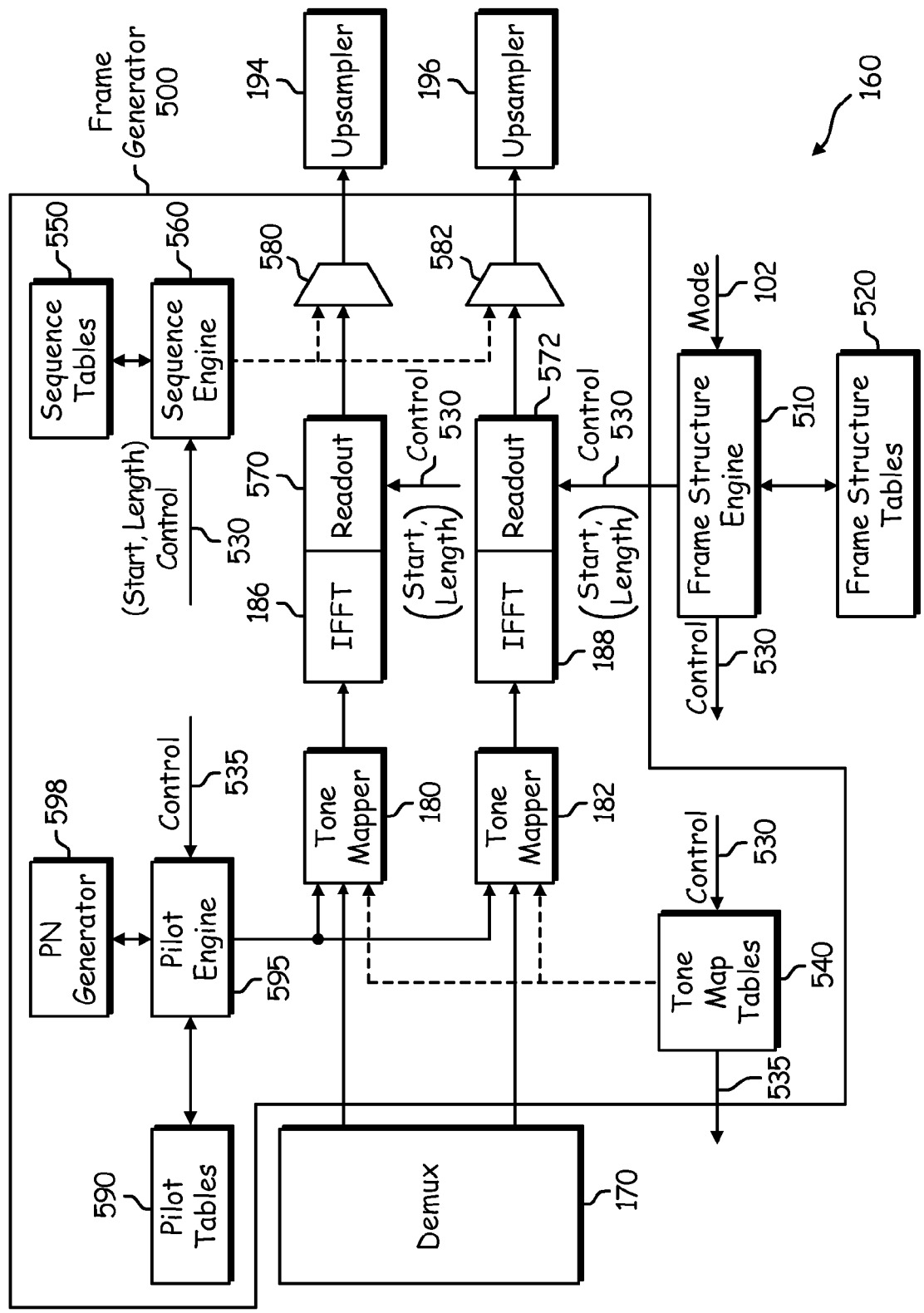
FIG. 5 is a schematic block diagram of a programmable transmitter capable of generating frames in different formats according to different operating modes in accordance with the present invention.

Referring now to FIG. 5, in order to accommodate for the various frame formats possible in different operating modes, in accordance with embodiments of the present invention, the transmitter 160 is programmable to generate frames in any type of frame format. The programmable transmitter 160 includes a frame generator 500 for generating a frame in a format corresponding to a current one of the potential operating modes of the transmitter 160, a frame structure engine 510 for controlling the generation of the frame in the frame format of the current operating mode and frame structure tables 520 that store the frame formats for each potential operating mode of the transmitter 160. The frame generator 500 is shown to include the tone mappers 180 and 182, the IFFTs 186 and 188, readout modules 570 and 580, multiplexers 580 and 582, tone map tables 540, time-domain sequence tables 550, time-domain sequence engine 560, pilot tables 590, pilot scrambling engine 595 and a pseudonoise (PN) generator 598. The tone map tables 540 maintain frequency domain frame segment formats, while the time-domain sequence tables 550 maintain time domain samples. The pilot tables 590 contain pilot scrambling sequences for use by the pilot scrambling engine 595 in generating pilot sequences in the frequency domain.

In operation, the frame structure engine 510 receives the mode selection signal 102 indicating the current operating mode of the transmitter 160, and accesses the frame structure tables 520 to retrieve the frame format for the current operating mode. Based on the retrieved frame format, the frame structure engine 510 produces one or more control signals (collectively referred to as control signal 530) that are input to various parts of the frame generator 500 to control generation of the frame in the retrieved frame format.

For each operating mode, the frame structure tables 520 maintain a frame format for each segment of the frame, where a segment may include one or more OFDM symbols. For example, frame segments may include a legacy short training segment, a legacy long training segment, a legacy signal-field segment, a high data rate or high throughput (HT) short training segment, an HT long training segment, an HT signal-field segment and a data segment. Thus, for a particular frame in a particular operating mode, the frame structure tables 520 can include a separate sub-entry for each frame segment of a frame that identifies the format of that frame segment. The frame structure engine 510 can generate a different control signal 530 for each sub-entry (frame segment of a frame) in the frame structure tables 520 to properly generate each frame.

For example, the frame structure engine 510 can generate one or more control signals 530 for each frame segment of the frame in the current operating mode to separately control the generation of each frame segment. Thus, the frame structure engine 510 can generate one or more control signals 530 to control generation of the short training sequence segment, one or more control signals 530 to control generation of the long training sequence segment, one or more control signals 530 to control generation of the signal-field segment and one or more control signals 530 to control generation of the data segment for a particular frame.

The control signals 530 are received by various parts of the frame generator 500. For example, a control signal 530 can be received at the tone map tables 540 to identify a frequency domain format of a short training sequence segment, a long training sequence segment, a signal-field segment or a data segment on a tone of a frame. As described above, in OFDM transmitters, the channel is divided into multiple subcarriers (tones), and each tone is one of a data tone, a pilot tone or an empty tone (e.g., a band edge guard tone or an empty center frequency tone). Data tones carry data to be demodulated at a receiver, while pilot tones carry known information supporting the receiver in demodulating the data received on the data tones. A frame is sent out over a channel (multiple tones), and therefore, the tone map tables 540 store the tone format for each data tone, pilot tone and empty tone in the frame segment. Thus, for example, in the IEEE 802.11(a) operating mode in which a 20 MHz channel is divided into 64 tones, 52 of which are used for pilot tones and data tones, the tone map tables 540 may include up to 64 entries per frame segment for the 802.11(a) operating mode, which uses a 64-point IFFT, depending on the number of tones used in a particular frame segment. Each entry in the tables 540 identifies the tone format of one of the 64 tones in the frame.

For a short training sequence segment and long training sequence segment, the tone format for each used tone in each operating mode in the tone map tables 540 represents a known data value (QAM constellation point) in the frequency domain. The control signal 530 indexes on the respective known data values for each used tone in the tone map tables 540 for the particular short training or long training sequence segment of the frame, and the selected known data sequences are input to the tone mapper 180 or 182 to map the known data sequences onto respective tones for inclusion in the short training or long training segment of the frame.

For the signal-field segment and data segment, the tone format for each used tone in each operating mode in the tone map tables 540 indicates whether the particular tone is a guard tone, pilot tone or data tone. For the data tones in the signal and data segments, the control signal 530 indexes on the respective data formats for each used tone in the tone map tables 540, and the selected data formats are input to one of the tone mappers 180 or 182 to place the incoming data stream from the demultiplexer 170 into the proper data format. For the pilot tones in the signal and data segments, the control signal 530 indexes on the respective pilot formats for each used tone in the tone map tables 540. Each pilot format may be a static pilot format containing pilot QAM symbols explicitly stored in the table, or a dynamic pilot format representing a specific request to perform external generation of pilot QAM symbols and feeding of those symbols into the symbol mapper.

Each dynamic pilot format includes a pilot format signal that identifies a particular pilot symbol sequence to be externally generated by the pilot scrambling engine 595. Thus, the selected dynamic pilot format for a particular tone is output by the tone map tables 540 as a pilot format signal 535 and received at the pilot engine 530 to identify a pilot symbol sequence for the signal-field segment or the data segment of the frame. The pilot scrambling engine 595 generates the pilot symbol sequence in the frequency domain by accessing the pilot tables 590 to retrieve one of the pilot scrambling sequences and multiplying the pilot scrambling sequence with a pseudorandom sequence generated by the pseudonoise generator 598. In other embodiments, there may be a separate pilot table 590 for each transmit mode, and the frame structure engine 510 can ensure via control signals 535 that the correct pilot table is selected depending on the mode signal 102.

Furthermore, a control signal 530 can be received at the time-domain sequence engine 560 to identify a time domain OFDM sample sequence in the time-domain sequence tables 550 for the short training sequence segment or long training sequence segment on a tone of a frame. The time-domain sequence engine 560 accesses the time-domain sequence tables 550 to retrieve the time domain OFDM sample sequence identified by the control signal 530, and inputs the time domain OFDM sample sequence to a multiplexer 580 or 582 for output as the time domain OFDM sample sequence for the short or long training sequence segment of a frame. Since the training sequences are known, the IFFT 186 or 188 can generate the time domain OFDM sample sequences off-line and store the time domain OFDM sample sequences in the time-domain sequence tables 550 to reduce processing time during frame generation. Although the time-domain sequence tables 550 can store the time domain OFDM sample sequences for both the short training and long training, in other embodiments, the long training sequences may be stored only in the tone map tables 540 in the frequency domain to reduce memory requirements for storing the long sequences in the time domain.

The control signal 530 received at the time-domain sequence engine 560 may also indicate a starting sample in the selected time domain OFDM sample sequence to implement a guard interval (i.e., a cyclic prefix) or a cyclic delay requirement for the operating mode. Also, the overall length of the segment in number of samples may be indicated. The time domain OFDM sample sequence for a particular frame segment may be repetitive, such that only a portion of the time domain OFDM sample sequence need be stored in the time-domain sequence tables 550. Thus, the time-domain sequence engine 560 can use the length to generate the complete time domain OFDM sample sequence beginning at the indicated starting sample for output to the multiplexer 580 or 582 and input to the upsampler 194 or 196.

Similarly, the tone map tables 540 may only specify the frequency-domain format for a sub-segment of a given frame segment such as one IFFT based interval. The frame structure engine 510 can then produce a control signal to the readout module 570 or 572 with a starting sample and/or length to generate a frame segment longer or shorter than the base interval. When the IFFT converts the OFDM symbol sequence from the frequency domain to the time domain, the readout module 570 or 572 can generate the complete time domain OFDM sample sequence beginning at the indicated starting sample for output to the multiplexer 580 or 582 and input to the upsampler 194 or 196.

In one embodiment, the frame structure tables 520, tone map tables 540, time-domain sequence tables 550 and pilot tables 590 are hardwired (stored) in read-only memory (ROM) (e.g., memory 66 shown in FIG. 2) within the transmitter 160. In another embodiment, the tables 520, 540, 550 and/or 590 are software configurable. For example, the transmitter 160 could include random-access memory (RAM) (e.g., memory 66) for some/all of the tables 520, 540, 550 and/or 590, and during a configuration period (e.g., during system power-up), the host processor (e.g., baseband processing module 64 shown in FIG. 2) of the transmitter 160 configures and loads the tables 520, 540, 550 and/or 590 with desired values.

Figure 6:
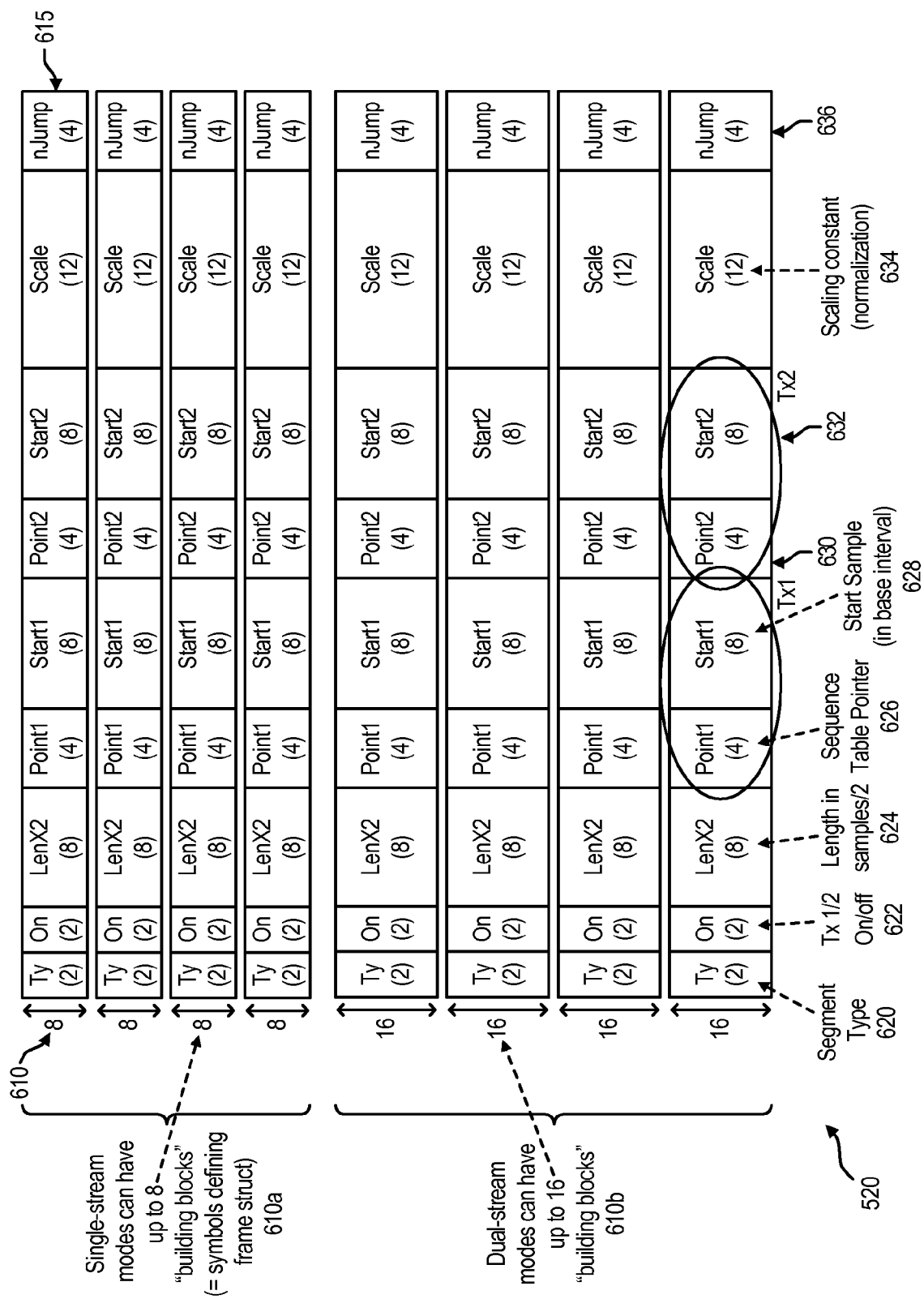
FIG. 6 is a diagram of a frame structure table for use in the programmable transmitter of FIG. 4 in accordance with the present invention.

FIG. 6 is a diagram of an exemplary frame structure table 520 in accordance with the present invention. The frame structure table 520 includes entries 610 identifying a frame format for each operating mode. In FIG. 6, both single-stream entries 610a identifying a frame format for each single-input (i.e., single antenna) operating mode and dual-stream entries identifying a frame format for each dual-input (i.e., two antennas) operating mode are illustrated. However, it should be understood that the frame structure table 520 includes any number of entries 610 based on the number of antennas and operating modes for each combination of antennas. Each entry 610 identifies a frame format for a particular operating mode. Within each entry 610 are a plurality of sub-entries (or rows) 615, each corresponding to a frame segment of the frame. The sub-entries 615 are organized in rows, and are sequentially accessed to construct a frame. In FIG. 6, up to eight sub-entries 615 are shown within a single entry 610. However, it should be understood that the number of sub-entries 615 per entry 610 may vary depending on the maximum number of potential frame segments in a given frame format or transmission mode.

Each sub-entry 615 includes a segment type field 620, an active field 622, a length field 624, a first pointer field 626, a first starting symbol field 628, a second pointer field 630, a second starting symbol field 632, a scaling field 634 and an njump field 636. The segment type field 620 indicates the frame segment type for the sub-entry 615. For example, the segment type field 620 can be set to (i) signal-field type to indicate that the sub-entry 615 is for a signal-field segment, (ii) data type to indicate that the sub-entry 615 is for a data segment, (iii) frequency domain type to indicate that the sub-entry 615 is for a training segment (short or long) in the frequency domain or (iv) time domain type to indicate that the sub-entry 615 is for a training segment in the time domain. When the segment type field 620 is set to frequency domain, the training QAM symbol for each tone for that training (short or long) frame segment is retrieved from one of the tone map tables 430 (shown in FIG. 5) in the frequency domain using 540a, then converted to the time-domain using the IFFT modules, and read-out using the specified start sample and overall length using the readout modules. Likewise, when the segment type field 620 is set to time domain, the OFDM training symbol sequence for that training (short or long) frame segment is retrieved from the time-domain sequence tables 550 (shown in FIG. 5). When the segment type field 620 is set to signal-field type or data type, the tone format for each tone in that frame segment is retrieved from a signal or data table in the tone map tables, whose entries are interpreted following the value tables 540. For example, in one embodiment, to distinguish segment types from each other, the values 0, 1, 2 and 3 can be used to specify training type segments in the time domain, training type segments in the frequency domain, signal-field type segments and data type segments, respectively.

The active field 622 indicates whether the frame segment associated with the sub-entry is to be transmitted in the frame sent on each antenna of the transmitter. For example, the active field can include one bit per transmitter antenna, where a "0" indicates that the frame segment is not transmitted on the antenna associated with the bit and a "1" indicates that the frame segment is included in the frame sent on the antenna associated with the bit. In one proposed 40 MHz MIMO mixed mode providing backwards compatibility to legacy devices, the frame sent on one of the antennas includes both the legacy training sequences and the HDR training sequences, while the frame sent on another antenna includes only the HDR training sequences. Thus, the frame format would include the format for legacy training segments. However, for one of the antennas, the format for the legacy training segments would be "off," indicating that the legacy training segments should not be included in the frame sent on that antenna. Instead, the antenna will be silent for the time period of the given frame segment, while the other antenna transmits the desired frame segment, using the other fields in 615 to specify the details of that transmission.

Each pointer field 626 and 630 includes a pointer to an entry in a frequency domain tone map table or a time domain sequence table. The first pointer field 626 includes a pointer for the first antenna, and the second pointer field 630 includes a pointer for the second antenna. However, it should be understood that the number of pointer fields is dependent on the number of antennas used by the transmitter. The starting fields 628 and 632 each include a respective starting sample that is input to either the time-domain sequence engine 560 (shown in FIG. 5) for time domain segment types or the readout module 570 or 572 (shown in FIG. 5) for segment types constructed in the frequency domain (i.e., frequency domain segment types, signal segment types and data segment types). In addition, the length field 624 indicates the length of the sequence, and is input to either the sequence engine or the readout module.

The scaling field 634 includes a scaling factor or normalization factor for the time domain OFDM sample sequence of the frame segment. This sample sequence is either the sequence generated by the time-domain sequence engine 560 or the IFFT readout modules 570, 572. The scaling factor is also input to either the sequence engine or the readout module to scale the magnitude of the time domain OFDM sample sequence in the frame segment. In another embodiment, a single scaler module per transmit path is used after the multiplexers 580, 582 in both the case of a sample sequence originating from the time-domain sequence engine and the case where the sample sequence is composed in the frequency domain and then frequency-to-time translated through the IFFT. The frequency domain QAM symbols per tone and/or time domain OFDM training samples per frame are stored in the tone map tables or sequence tables with a magnitude which may not always lead to the desired antenna output power. Therefore, depending on the specific use of the respective frequency-domain or time-domain use, this scaling operation will ensure through appropriate rescaling that the output power from each antenna has the desired power. For instance, based on a scenario of the number of antennas in use and/or the number of tones in use, the scaling factor is used to modify the symbol magnitudes for different scenarios.

For example, the magnitude of the stored training symbols can be set for the scenario that two antennas are transmitting the same signal simultaneously. If the operating mode uses only one antenna for that frame segment, the scaling field 634 can be set to increase the magnitude of the samples in that frame segment to achieve the same total transmit power that would otherwise be radiated from two antennas. Likewise, if the operating mode uses more than two antennas for that frame segment, the scaling field 634 can be set to decrease the magnitude of the symbols in that frame segment to distribute the power over more than two antennas. As another example, in certain training segments only every fourth tone may have a non-zero entry as specified by the tone map table entry values 540a. Therefore, without appropriate scaling, the transmit power would be four times smaller than a frame segment in which all tones are used. The scaling field 634 can now be set to increase the magnitude of the samples in that frame segment to achieve the desired total output power. In another embodiment, a scaling field 634 could be specified individually for each transmit antenna to achieve an even larger degree of flexibility. With multiple scaling fields, the active field 622 becomes obsolete when a given antenna is set to be silent for a given frame segment by simply setting the scaling field to zero.

The njump field 636 includes an njump index that identifies the next sub-entry 615 to jump to in order to allow for nBursting multi-frame processing. An nBursting frame may or may not use all of the training segments in the operating mode frame format. Moreover, the order of training segments may or may not change for an nBursting frame. Thus, the njump index can be used to skip sub-entry rows 615 in an arbitrary order.

Figure 8:
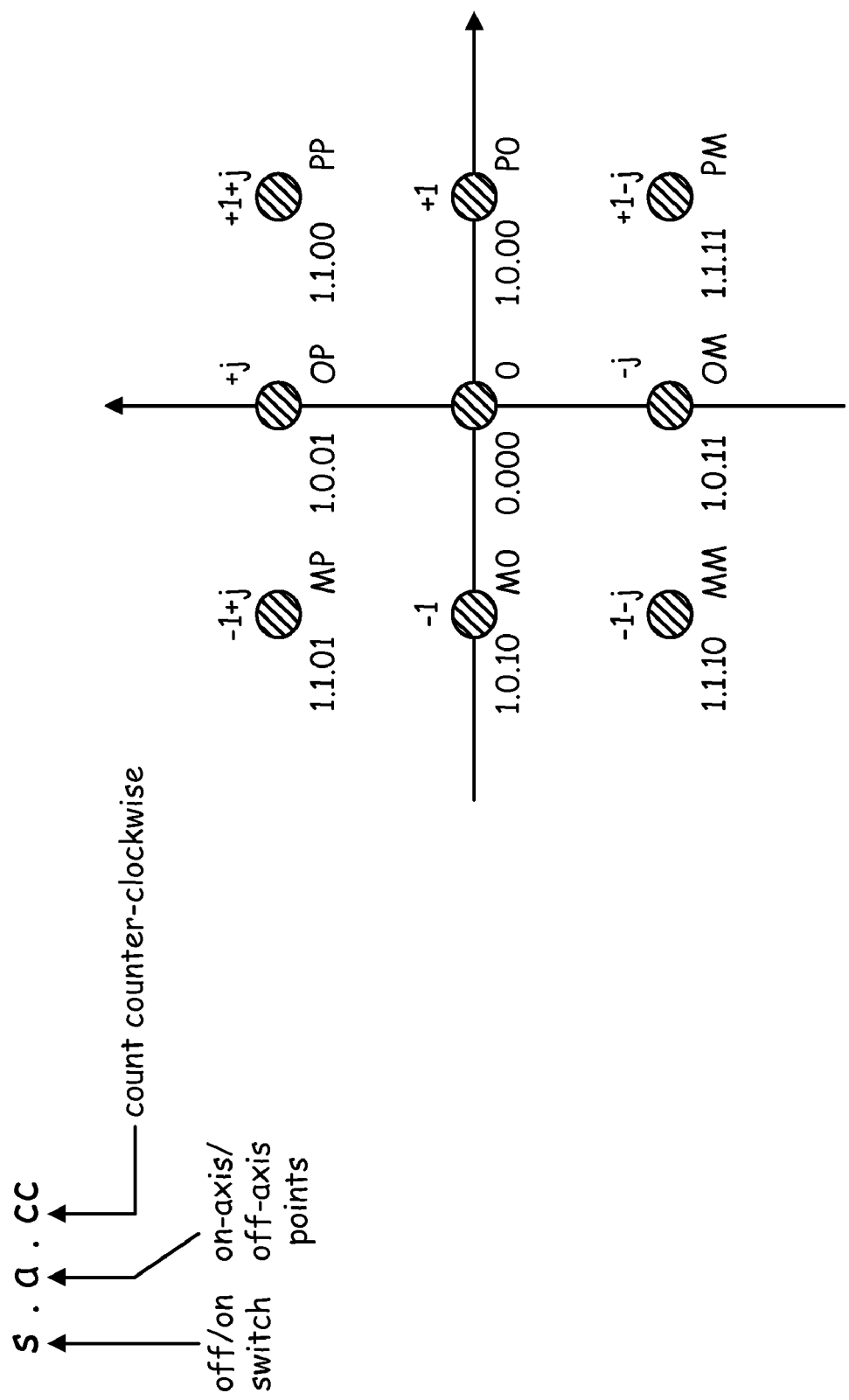
FIG. 8 is a diagram of exemplary frequency domain tone map entries in accordance with the present invention.

FIGS. 7A, 7B and 7C are diagrams of exemplary values for use in frequency domain tone map tables 540 in accordance with the present invention. FIG. 7A illustrates exemplary 4-bit training sequence segment format values and corresponding interpretations that can be specified for each tone in a training sequence segment tone map table, FIG. 7B illustrates exemplary signal segment format values for a signal-field segment tone map table and FIG. 7C illustrates exemplary data segment format values for a data segment tone map table. The values for the training sequence segment tone map table shown in FIG. 7A can be used for either a short training sequence segment or a long training sequence segment of a frame. The training sequences are deterministic sequences known to both the transmitter and the receiver and typically use a small number of possible QAM constellation points. Therefore, the frequency domain representations of the training sequences can be stored using a simple constellation. In FIG. 7A, nine constellation point values (i.e., entries "8"-"15") and an "off" value corresponding to an empty tone (i.e., entry "0") are shown. The constellation point mapping and corresponding frequency domain entry coding in the training sequence segment tone map table are also shown in FIG. 8. For each training segment of the operating modes, the pointer in the frame structure engine points to one of the training tone map tables that includes a sequence of values corresponding to constellation points for each tone used in the training segment.

The possible signal segment format values in the signal-field segment tone map table shown in FIG. 7B include an empty value (i.e., entry "0"), data format values (i.e., entries "1"-"4") and pilot format values (i.e., entries "8"-"15"), depending on whether the respective tone in the signal-field segment is transmitting data or pilot signals. The data format values provide for different data rotations, depending on the particular operating mode. For example, in a proposed 40 MHz MIMO operating mode, the data in the high data rate (HDR) signal-field segment in the upper sub-channel (upper 20 MHz) of the channel is rotated 90° from the data in the HDR signal-field segment in the lower sub-channel (lower 20 MHz).

Each pilot format value is either a static pilot format or a dynamic pilot format. A static pilot format includes a sequence of pilot symbols in the frequency domain for each tone. Exemplary potential pilot symbols are represented by entries "8"-"11" in the table. The static pilot symbol sequence for each tone is stored in the signal-field segment tone map table and corresponds to a particular constellation point, as shown in FIG. 8. A dynamic pilot format includes a pilot format signal for each tone that instructs the pilot scrambling engine on how to generate the dynamic pilot symbol sequence in the frequency domain for each tone. Exemplary potential pilot format signals are represented by entries "12"-"15". The pilot format signal for a particular tone specifies whether the pilot scrambling engine should generate a dynamic pilot symbol sequence for the particular tone without triggering the pilot tables or the pseudonoise generator, or the pilot scrambling engine should generate a dynamic pilot symbol sequence for the particular tone by triggering one or both of the pilot tables and the pseudonoise generator. The triggers will be described in more detail below in connection with FIGS. 11 and 12.

The possible data segment format values of the data segment tone map table shown in FIG. 7C include an empty value (i.e., entry "0"), a data format value (i.e., entry "1") and pilot format values (i.e., entries "8"-"15"), depending on whether the particular tone in the data segment is a guard tone, a data tone or a pilot tone, respectively. The data format values are used in the data segment to allow incoming data streams input to the tone mappers to be placed on the tones of the frame. The pilot format values shown in FIG. 7C are equivalent to the pilot format values shown in the signal-field segment tone map table in FIG. 7B.

Figure 9:
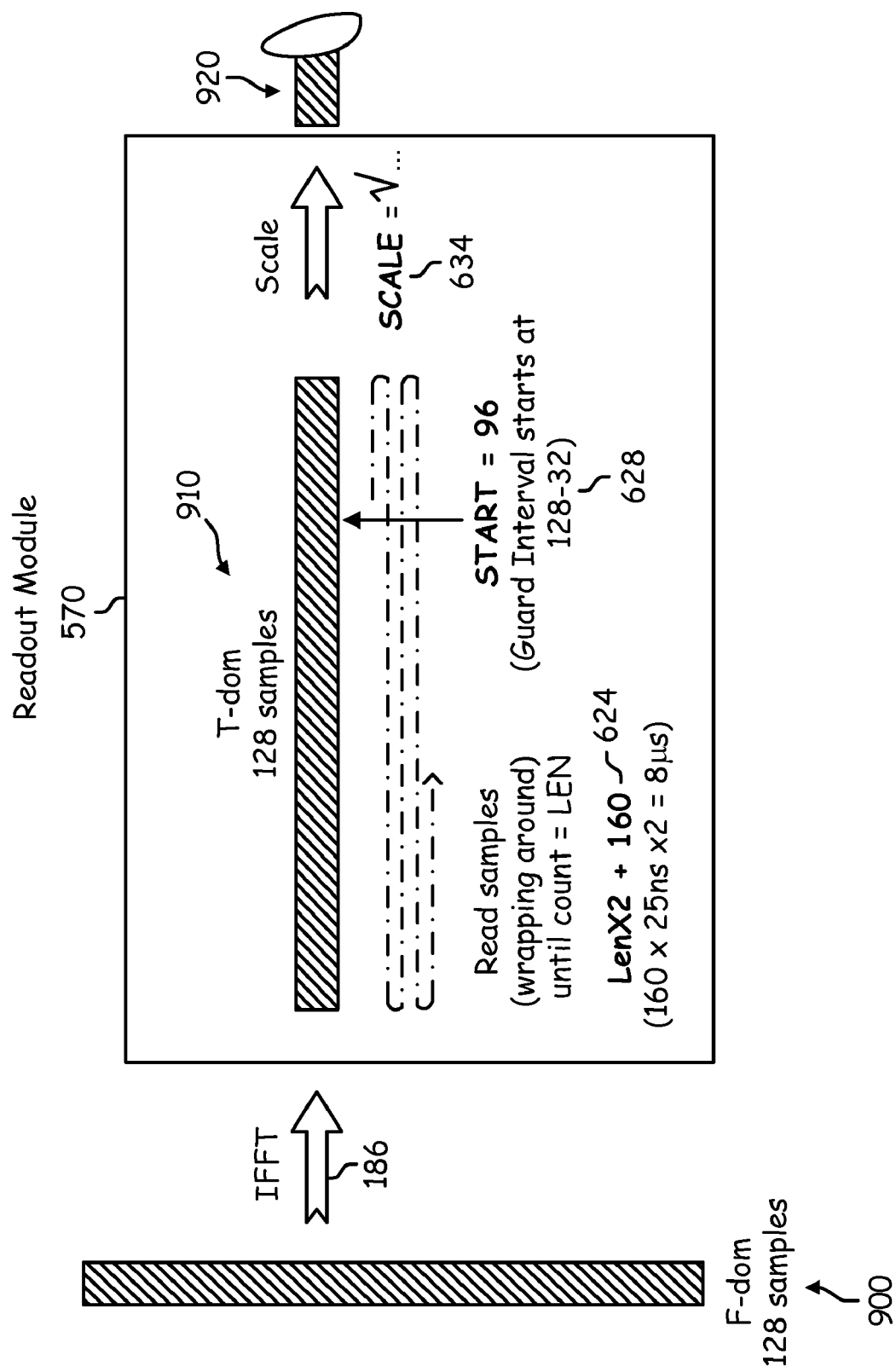
FIG. 9 is a diagram illustrating the generation of time domain training symbols from frequency domain training symbols using the programmable transmitter of FIG. 4 in accordance with the present invention.

FIG. 9 is a diagram illustrating the generation of time domain OFDM training samples from frequency domain QAM training symbols given per tone in a tone map table 540 in accordance with the present invention. In FIG. 9, the frequency domain QAM training symbol 900 for each tone obtained from the training sequence segment tone map tables (shown in FIG. 7A) is input to the IFFT 186 to convert all of the frequency domain QAM training symbols 900 to a time domain OFDM training symbol 910 containing a number of samples. Using the starting sample 628 and length 624 in the frame structure table, the readout module 570 generates the complete time domain OFDM training symbol at the indicated length 624 and beginning at the indicated starting sample 628. For example, as shown in FIG. 9, each frequency domain training segment 900 has a length of 128 samples and the time domain OFDM training symbol 910 (which is a superposition of the time domain QAM symbols per tone) has an initial length of 128 samples. The readout module 570 begins at sample 96 and reads out the samples in order wrapping around to the first sample until the length of the time domain symbol sequence equals the specified length 624. The readout module 570 further scales the time domain OFDM training symbol 910 by the scaling factor 634 in the frame structure tables. The scaling factor is applied to the complete time domain OFDM training symbol 910 to scale the magnitude of the symbol, and the scaled time domain OFDM training symbol 920 is output by the readout module 570. It should be noted that in the embodiment shown in FIG. 9, the number of samples to be generated is given by two times the number stored in the LenX2 field 624 to save one bit in the bitwidth of each sub-entry 615 of the frame structure table. However, in other embodiments, the length (total number of samples requested for a given frame segment) could be specified directly in the length field 624, i.e., without the factor 2 modification.

Figure 10:
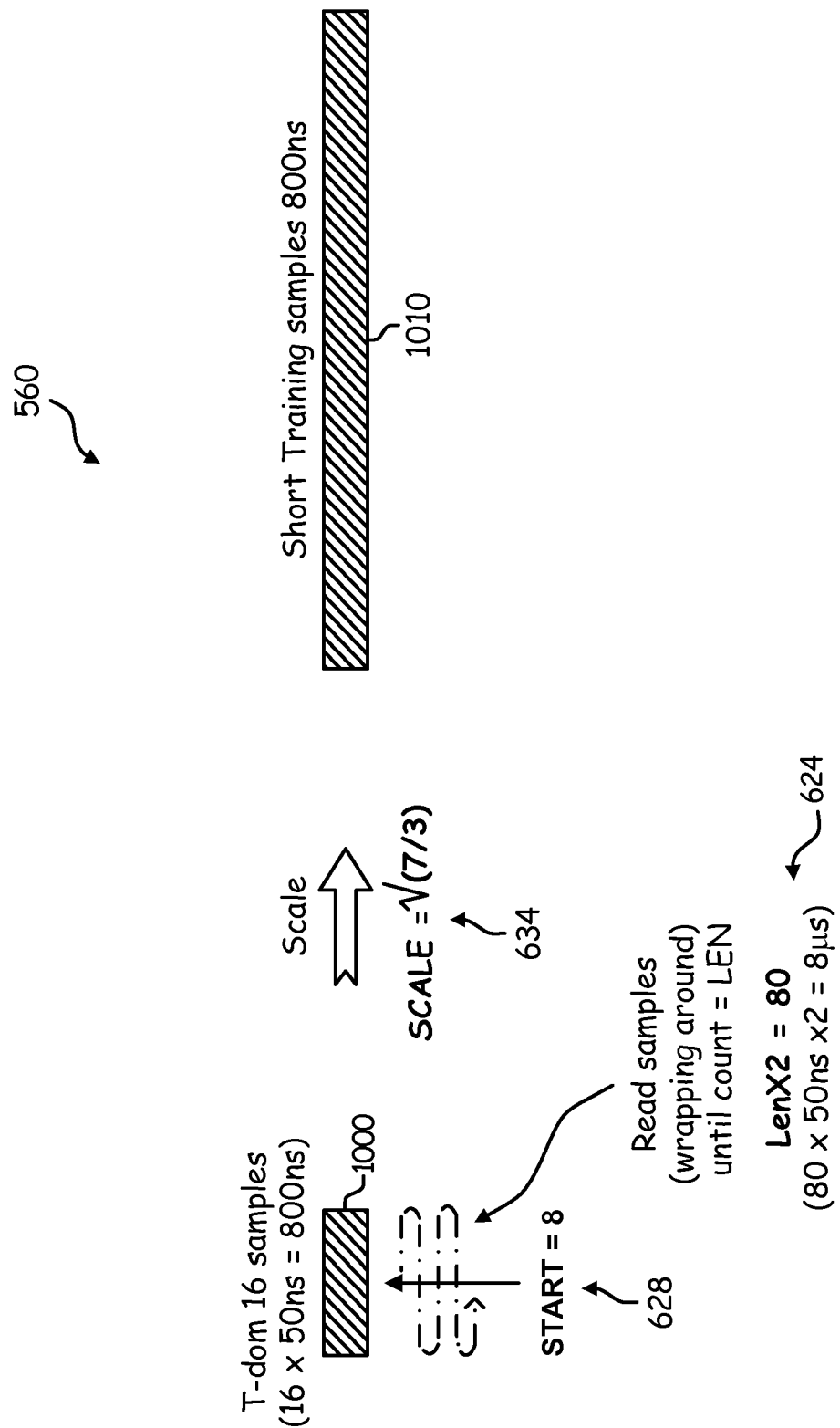
FIG. 10 is a diagram illustrating the generation of training symbols in the time domain using the programmable transmitter of FIG. 5 in accordance with the present invention.

FIG. 10 is a diagram illustrating the generation of a sequence of OFDM training symbols in the time domain in accordance with the present invention. In FIG. 10, the time domain OFDM training symbols 1000 are obtained from the time domain time-domain sequence tables 550 (shown in FIG. 5) and input to the time-domain sequence engine 560. Using the starting sample 628 and length 624 in the frame structure table, the time-domain sequence engine 560 generates the complete sequence of time domain OFDM training symbols at the indicated length 624 and beginning at the indicated starting sample 628. For example, as shown in FIG. 10, the sequence time domain OFDM training symbols 1000 have an initial length of 16 samples. The time-domain sequence engine 560 begins at sample 8 and reads out the samples in order wrapping around to the first sample until the length of the time domain OFDM symbol sequence equals the specified length 624. Again, in this example and corresponding embodiment, the true length in number of samples to be generated by the time domain sequence engine is given by two times LenX2, that it, 2*80=160 overall samples. The time-domain sequence engine 560 further scales the time domain OFDM training symbols by the scaling factor 634 in the frame structure tables. The scaling factor is applied to the complete sequence of time domain OFDM training symbols to scale the magnitude of the symbols, and the scaled time domain OFDM training symbols 1010 are output by the time-domain sequence engine 560.

Figure 11:
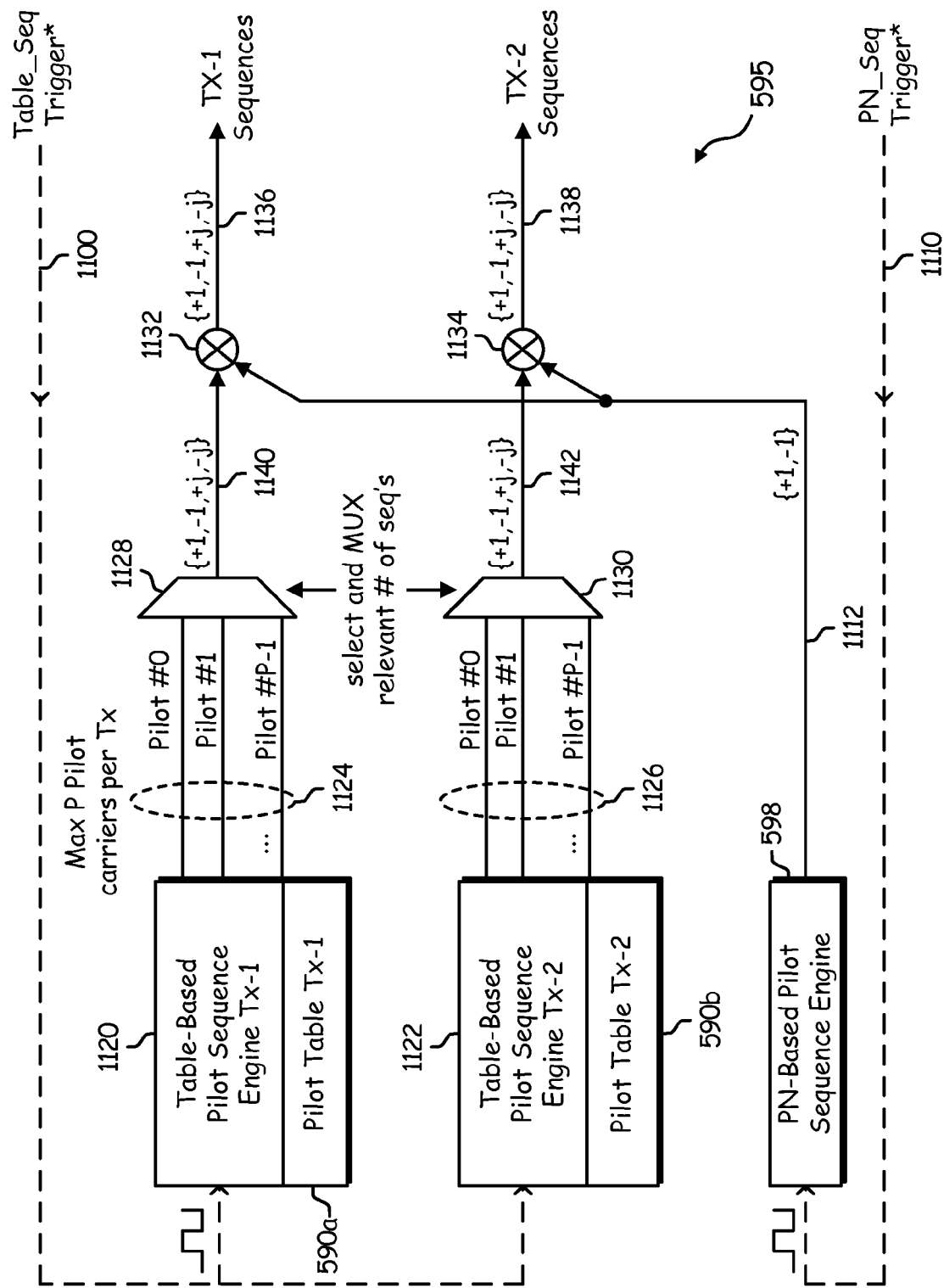
FIG. 11 is a schematic diagram of a pilot scrambling engine for use in the programmable transmitter of FIG. 4 in accordance with the present invention.

FIG. 11 is a schematic diagram of a pilot scrambling engine 595 for use in the programmable transmitter of FIG. 4 in accordance with the present invention. The pilot scrambling engine 595 includes a table-based pilot sequence engine 1120 and 1122 for each transmit antenna, multiplexers 1128 and 1130 and multipliers 1132 and 1134.

In operation, the table-based pilot sequence engines 1120 and 1122 read out pilot sequences 1124 and 1126 from the respective pilot tables 590a and 590b in response to triggers 1100 provided by the pilot scrambling engine 595 and provide the pilot sequences 1124 and 1126 to the multiplexers 1128 and 1130. The multiplexers 1128 and 1130 select and/or multiplex relevant ones of the pilot sequences 1124 and 1126 to produce respective pilot sequences 1140 and 1142. The pilot sequences 1140 and 1142 are input to the multipliers 1132 and 1134, respectively, to multiply the pilot sequences 1140 and 1142 with a pseudorandom sequence 1112 produced by the pseudonoise generator 598 in response to triggers 1110 provided by the pilot scrambling engine 595.

The triggers are produced by the pilot scrambling engine 595 in response to the selected dynamic pilot format (pilot format signal) given per tone in the signal-field or data segment tone map table. For example, when the selected dynamic pilot format is the format corresponding to entry "12" from either table 540b or 540c, the pilot scrambling engine does not trigger either the table-based pilot sequence engines 1120 and 1122 or the pseudonoise generator 598. As another example, when the selected dynamic pilot format is the format corresponding to entry "13" in either table 540b or 540c, the pilot scrambling engine 595 triggers only the table-based pilot sequence engines 1120 and 1122. As a further example, when the selected dynamic pilot format is the format corresponding to entry "14" in either table 540b or 540c, the pilot scrambling engine 595 triggers only the pseudonoise generator 598. Finally, when the selected dynamic pilot format is the format corresponding to entry "15" in either table 540b or 540c, the pilot scrambling engine 595 triggers both the table-based pilot sequence engines 1120 and 1122 and the pseudonoise generator 598.

Figure 12:
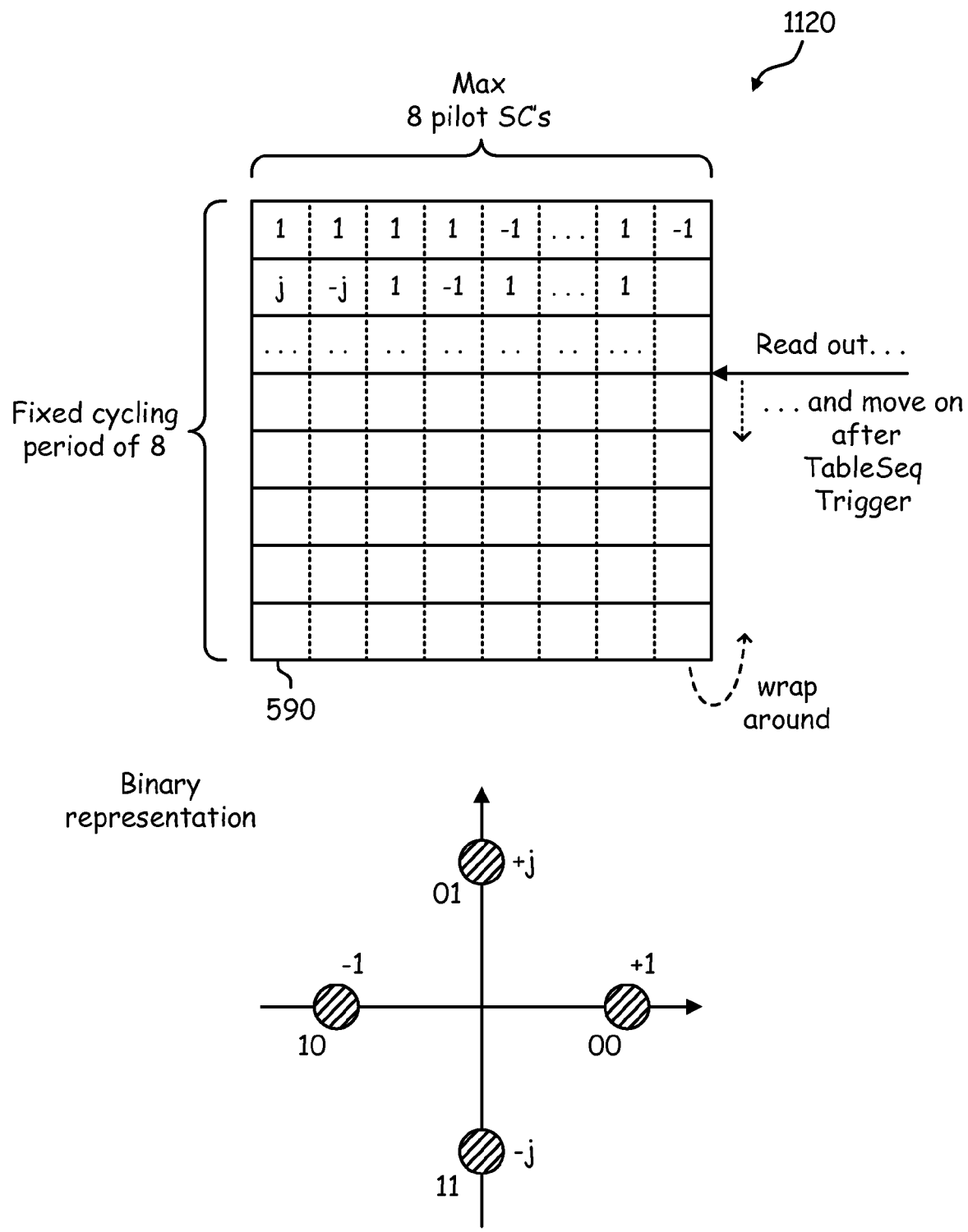
FIG. 12 illustrates an exemplary operation of a table-based pilot sequence engine for use in the pilot scrambling engine of FIG. 11 in accordance with the present invention.

FIG. 12 illustrates an exemplary operation of a table-based pilot sequence engine (e.g., pilot sequence engine 1120) for use in reading out pilot sequences from the pilot table 590 in accordance with the present invention. FIG. 12 further illustrates the binary representations of exemplary pilot symbols stored in the pilot table 590. The table-based pilot sequence engine 1120 receives a trigger signal from the pilot sequence engine and reads out a row of pilot symbols from the pilot table 590 based on the state of the trigger signal. For example, when the trigger signal is in a first state (i.e., "no trigger"), the pilot sequence engine 1120 reads out a current pilot sequence from the pilot table 590 (i.e., the row currently pointed to by the pilot sequence engine 1120), and when the trigger signal is in a second state (i.e., trigger), the pilot sequence engine 1120 reads out the next row following the current row from the pilot table 590. Each trigger causes the pilot sequence engine 1120 to move down a row in the pilot table 590 to read out the next row from the pilot table 590. When the last row is read out of the pilot table 590, and another trigger is received, the trigger causes the pilot sequence engine 1120 to wrap around the pilot table 590 and read out the first row in the pilot table 590. In a further embodiment, a length specifier could be used for each mode of operation (transmission mode), thereby causing the pilot table readout to perform an early wrap-around every time a certain number of pilot polarities have been read from the table. This way, a different periodicity in the pilot polarities coming from the pilot table can be achieved, in contrast to a periodicity that has to match with the overall table size. It should be noted that there is generally a multitude of pilot sequence tables, one of which may be accessed for the current mode of operation in the control signals 530 and 535.

Figure 13:
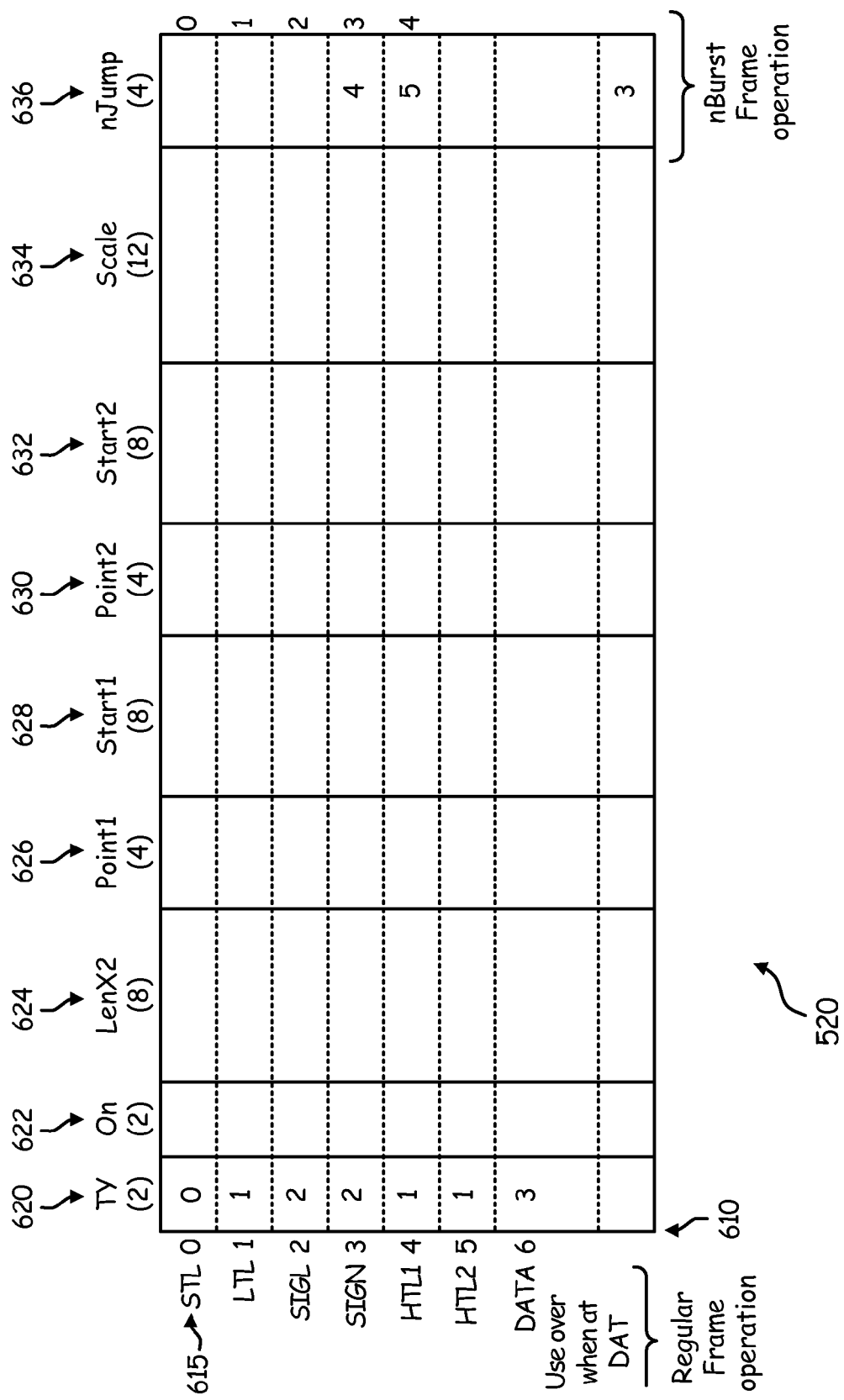
FIG. 13 is a diagram of exemplary entries in the frame structure table capable of generating an nBurst segment using the programmable transmitter of FIG. 5.

FIG. 13 is a diagram of exemplary sub-entries 615 in an entry 610 of one frame structure table capable of generating an nBurst segment using the programmable transmitter of FIG. 5, in accordance with the present invention. nBursting refers to a fast concatenation of frames in which some of the training segments may be skipped in all frames except for the very first frame. FIG. 13 illustrates exemplary sub-entries 615 including the formats of various frame segments of a frame sent according to a particular operating mode. In the segment type field 620, the first sub-entry (labeled "0") will generate a legacy short training sequence segment, the second sub-entry (labeled "1") will generate a legacy long training sequence segment, the third sub-entry (labeled "2") will generate a legacy signal-field segment, the fourth sub-entry (labeled "3") will generate a high data rate or high throughput (HT) signal-field segment, the fifth sub-entry (labeled "4") will generate a HT long training sequence segment, the sixth sub-entry (labeled "5") will generate another HT long training sequence segment and the seventh and subsequent sub-entries (labeled "6") will generate all data segments of the frame. When a data segment type is found (Type=3), the corresponding sub-entry will be used over and over again until all data segments in the frame have been generated. As described above in connection with FIG. 6, each sub-entry 615 also includes an active field 622, a length field 625, pointer fields 626 and 630, start fields 628 and 632 and a scale field 634.

In addition, each sub-entry 615 includes an njump field 636 having an njump index that identifies the next sub-entry 615 to jump to in order to allow for nBursting multi-frame processing. An nBursting frame may or may not use all of the training segments in the operating mode frame format. Moreover, the order of training segments may or may not change for an nBursting frame. Thus, the njump index can be used to skip sub-entry rows 615 in an arbitrary order.

For example, when starting to compose an nBurst type frame, the frame structure engine looks at the njump field 636 of the last row (last sub-entry 615), and uses the njump index in that njump field 636 to determine the first row (sub-entry 615) for the frame. After generating the frame segment for the first row, the frame structure engine looks at the njump field 636 for the completed frame segment to determine the next row (sub-entry 615) for the frame. As shown in FIG. 13, the njump index in the last sub-entry 615 is a pointer to the sub-entry 615 of "3". Thus, to construct an nBurst frame, the frame structure engine begins the frame with the frame segment corresponding to the sub-entry "3," which is the HT signal-field segment. Thereafter, the frame structure engine looks at the njump field 636 for each sub-entry 615 to determine the next sub-entry 615 to use in the frame.

Figure 14:
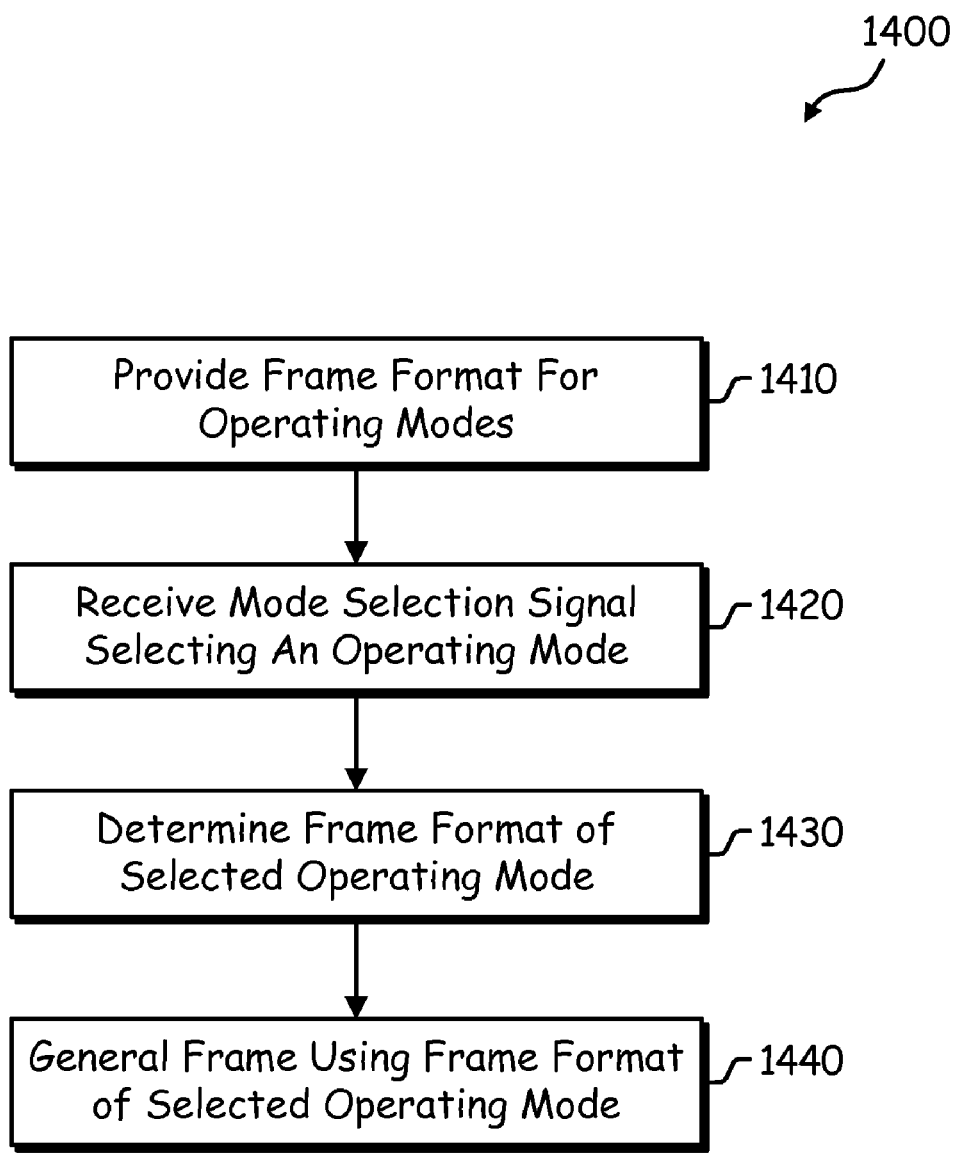
FIG. 14 is a logic diagram of a method for generating a frame in a format corresponding to one of a plurality of operating modes using a programmable transmitter in accordance with the present invention.

FIG. 14 is a logic diagram of an exemplary process 1400 for a transmitter to generate a frame for transmission over the air interface in a format corresponding to one of a plurality of operating modes using a programmable transmitter in accordance with the present invention. The processing begins at step 1410 where a frame structure table containing a respective frame format for each of the plurality of operating modes is provided to the transmitter. Examples of operating modes include 20 MHz channels for a 2.4 to 2.5 GHz frequency band, 20 and 40 MHz channels for a 4.9 to 5.850 GHz frequency band, multiple MIMO transmit modes utilizing two, three, or four transmit paths, data rates up to at least 480 Megabits per second (Mbps) and frames including at least 4096 octets. There is a separate master entry for operating mode in the frame structure table, and a separate sub-entry under each master entry for each frame segment of a frame generated in accordance with the operating mode.

The process then proceeds to step 1420 where a mode selection signal indicative of a select operating mode is received. Thereafter, at step 1430, the frame format of the select operating mode is determined from the frame structure table. Finally, at step 1440, a frame is generated in the frame format of the select operating mode.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

The preceding discussion has presented a programmable transmitter for generating frames of different formats according to different operating modes. As one of ordinary skill in the art will appreciate, other embodiments may be derived from the teachings of the present invention without deviating from the scope of the claims.

What is claimed is:

1. A transmitter for generating a frame in one of a plurality of operating modes for transmission of the frame over a plurality of tones in a channel, the transmitter comprising:
   a table for storing respective segment formats for each of the segments of the frame, each of the segment formats being associated with one of the plurality of operating modes and each of the segment formats including respective tone formats for each of the tones; and
   a frame generator coupled to receive a control signal indicative of a select operating mode and operable to generate the frame in the segment formats of the select operating mode in response to the control signal;
   wherein the table includes;
      a frame structure table for storing a respective frame format for each of the plurality of operating modes, each frame format including a respective entry for each of the segments of the frame, each entry including a segment type and a respective pointer for each of the tones; and
      a tone map table for storing the respective tone formats for each of the frame segments for each of the operating modes, each pointer in the entry of the frame structure table pointing to one of the tone formats;
   wherein each entry in the frame structure table further includes an additional pointer for each antenna of the transmitter, a start field indicating a starting sample of the frame segment for each antenna of the transmitter, a length field indicating a length of the frame segment of the frame for the respective entry, a scale field indicating a scaling factor for the frame segment of the frame for each antenna of the transmitter and an active field indicating whether the frame segment is included in the frame sent on each antenna of the transmitter.

2. The transmitter of claim 1, further comprising:
a frame structure engine coupled to receive a mode select signal indicative of the select operating mode and operable to access the frame structure table and tone map table to determine the frame format of the select operating mode and produce the control signal to control the frame generator.

3. The transmitter of claim 1, wherein the frame generator further comprises:
a tone mapper coupled to map a data sequence into symbols to be included in the frame in response to the control signal; and
an inverse fast Fourier transform (IFFT) module coupled to convert the symbols from a frequency domain to a time domain to produce the plurality of tones for transmitting the frame.

4. The transmitter of claim 3, further comprising:
a scrambler coupled to receive an outgoing digital signal including data and to scramble the outgoing digital signal to produce scrambled data;
a channel encoder coupled to encode the scrambled data to produce encoded data;
an interleaver coupled to interleave the encoded data to produce interleaved data; and
a demultiplexer coupled to divide the interleaved data into two or more data streams, the data sequence input to the tone mapper including one of the two or more data streams.

5. The transmitter of claim 3, further comprising:
a space time encoding module coupled to space-time encode the plurality of tones to produce a plurality of space-time encoded subcarriers;
a digital module coupled to filter the plurality of space-time encoded subcarriers to produce digital baseband signals;
a digital to analog converter coupled to convert the digital baseband signals into analog baseband signals;
an in-phase/quadrature modulator coupled to mix the analog baseband signals with a local oscillation to produce up-converted RF signals; and
a power amplifier coupled to amplify the up-converted RF signals to produce amplified up-converted RF signals.

6. The transmitter of claim 3, wherein the IFFT module is operable to convert the symbols from the frequency domain to the time domain to produce the plurality of tones by utilizing coded orthogonal frequency division multiplexing (OFDM) with sixty-four or one hundred twenty eight point IFFT.

7. The transmitter of claim 3, wherein each of the plurality of tones is one of a data tone, a pilot tone or an empty tone and each of the tone formats is one of a data format for each of the data tones, a pilot format for each of the pilot tones or an empty format for each of the empty tones.

8. The transmitter of claim 7, wherein the segment type includes a data-field type corresponding to a data segment of the frame and a signal-field type corresponding to a signal segment of the frame.

9. The transmitter of claim 8, wherein the data sequence input to the tone mapper is a known data stream, and wherein the tone format for a signal-field type of the frame indicates a rotation of the known data stream.

10. The transmitter of claim 8, wherein the pilot format comprises one of a static pilot sequence input to the tone mapper or a pilot format signal for generating a dynamic pilot sequence, and further comprising:
a pilot table for storing pilot sequences;
a pseudonoise generator for generating a pseudorandom sequence; and
a pilot scrambling engine coupled to receive the pilot format signal from the tone map table, access the pilot table to read out one of the pilot sequences and receive the pseudorandom sequence from the pseudonoise generator based on the pilot format signal, wherein the pilot scrambling engine is further operable to multiply the pseudorandom sequence and the one of the pilot sequences to generate the dynamic pilot sequence.

11. The transmitter of claim 10, wherein the pilot scrambling engine comprises a pilot sequence engine coupled to receive the pilot format signal and read out the one of the pilot sequences from the pilot table, and wherein a first value of the pilot format signal causes the pilot sequence engine to read out a current pilot sequence from the pilot table to produce the dynamic pilot sequence and a second value of the pilot format signal triggers the pilot sequence engine to read out a next pilot sequence following the first pilot sequence from the pilot table to produce the dynamic pilot sequence.

12. The transmitter of claim 11, wherein the pilot table comprises a respective pilot table for each antenna of the transmitter, and wherein the pilot scrambling engine comprises a respective pilot sequence engine for each antenna of the transmitter, the pilot scrambling engine multiplying the respective one of the pilot sequences read out from each of the respective pilot tables with the pseudorandom sequence to produce respective dynamic pilot sequences for each of the antennas.

13. The transmitter of claim 12, wherein the pilot scrambling engine is further operable to receive a first pseudorandom sequence from the pseudonoise generator based on a first value of the pilot format signal to produce the dynamic pilot sequence and to trigger the pseudonoise generator to receive a second pseudorandom sequence from the pseudonoise generator based on a second value of the pilot format signal to produce the dynamic pilot sequence.

14. The transmitter of claim 1, wherein the segment type includes a frequency domain training type corresponding to a training segment of the frame, and further comprising:
a training table for storing training sequences of the training segment of the frame for each of the operating modes, the training sequences including a respective tone symbol for each of the tones;
wherein each pointer in the entry of the frame structure table for the frequency domain training type points to one of the training sequences in the training table per antenna.

15. The transmitter of claim 14, wherein each entry in the frame structure table further comprises a start field indicating a starting sample, a length field indicating a length of the training segment of the frame for the respective entry and a scale field indicating a scaling factor for the training segment of the frame.

16. The transmitter of claim 15, wherein the training table is a training tone map table in the frequency domain, and wherein the data sequence input to the tone mapper includes the one of the training sequences pointed to, and wherein the frame generator further comprises:
a readout module coupled to receive the control signal and to receive the plurality of tones from the IFFT, each including a respective time domain tone symbol that collectively forms an orthogonal frequency division multiplexed (OFDM) symbol containing samples, the control signal indicating the starting sample in the OFDM symbol, the length for the training segment of the frame and the scaling factor, and wherein the symbol readout module is operable to generate a complete training sequence of OFDM symbols for the training segment of the frame using the starting sample and the length and to scale the complete training sequence of OFDM symbols by the scaling factor to produce the training segment of the frame.

17. The transmitter of claim 15, wherein the segment type comprises a time domain training type corresponding to a training segment of the frame, and further comprising:
   a sequence table for storing time domain training sequences for the time domain training type, each time domain training sequence including a time domain tone symbol for ones of the tones that collectively form an orthogonal frequency division multiplexed (OFDM) symbol containing samples, each pointer in the entry of the frame structure table for the time domain training type pointing to one of the training sequences in the sequence table; and
   a sequence engine coupled to receive the control signal, the control signal including the starting sample, the length and the scaling factor for the training sequence segment of the frame, and wherein the sequence engine is operable to generate a complete training sequence of OFDM symbols for the training segment of the frame using the starting sample and the length and to scale the complete OFDM symbol by the scaling factor to produce the training segment of the frame.

18. The transmitter of claim 1, wherein the entry in the frame structure table further includes an nJump field having an nJump index that identifies a next entry corresponding to a next frame segment to generate an nBurst frame.

19. The transmitter of claim 1, wherein the plurality of operating modes comprises at least one of:
   20 MHz channels for a 2.4 to 2.5 GHz frequency band;
   20 and 40 MHz channels for a 4.9 to 5.850 GHz frequency band;
   multiple MIMO transmit modes utilizing two, three, or four transmit paths;
   data rates up to at least 480 Megabits per second (Mbps); and
   frames including at least 4096 octets.

20. The transmitter of claim 1, further comprising:
   a processor operable to generate the table during a configuration period of the transmitter and store the table in a memory.

* * * * *